(12) United States Patent
Jin et al.

(10) Patent No.: US 11,824,225 B2
(45) Date of Patent: Nov. 21, 2023

(54) SEPARATOR INCLUDING SUBSTRATE, HYDROPHILIC BLOCKING LAYER, AND POLAR POLYMER BONDING WITH NODAL STRUCTURE, AND METHOD OF PREPARING THE SAME

(71) Applicant: BYD COMPANY LIMITED, Shenzhen (CN)

(72) Inventors: Lina Jin, Shenzhen (CN); Bowen Xuan, Shenzhen (CN); Xiaodong Cao, Shenzhen (CN); Jinxiang Wu, Shenzhen (CN); Jun Shan, Shenzhen (CN); Gang Hu, Shenzhen (CN); Long He, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 285 days.

(21) Appl. No.: 16/967,398

(22) PCT Filed: Jan. 31, 2019

(86) PCT No.: PCT/CN2019/074196
§ 371 (c)(1),
(2) Date: Aug. 4, 2020

(87) PCT Pub. No.: WO2019/154275
PCT Pub. Date: Aug. 15, 2019

(65) Prior Publication Data
US 2021/0218113 A1    Jul. 15, 2021

(30) Foreign Application Priority Data
Feb. 6, 2018 (CN) .......................... 201810119665.2

(51) Int. Cl.
*H01M 50/414* (2021.01)
*H01M 50/403* (2021.01)
(Continued)

(52) U.S. Cl.
CPC ....... *H01M 50/414* (2021.01); *H01M 50/403* (2021.01); *H01M 50/42* (2021.01);
(Continued)

(58) Field of Classification Search
CPC ............. H01M 50/457; H01M 50/414; H01M 50/403; H01M 50/446; H01M 50/451; H01M 50/434
(Continued)

(56) References Cited

U.S. PATENT DOCUMENTS

2014/0050965 A1* 2/2014 Ha ...................... H01M 50/457
429/144
2015/0263324 A1* 9/2015 Lee ..................... H01M 50/491
427/532
(Continued)

FOREIGN PATENT DOCUMENTS

CN    101905555 A    12/2010
CN    102117905 A    7/2011
(Continued)

OTHER PUBLICATIONS

An et al., Multilayered separator based on porous polyethylene layer, $Al_2O_3$ layer, and electro-spun PVdF nanofiber layer for lithium batteries, Feb. 2014, Journal of Solid State Electrochemistry, 18, 1807-1814 (Year: 2014).*
(Continued)

*Primary Examiner* — Sean P Cullen
(74) *Attorney, Agent, or Firm* — Wenye Tan

(57) ABSTRACT

The present disclosure provides a polymer separator and preparation method thereof, and a lithium-ion battery including the polymer separator and preparation method thereof. The polymer separator includes a porous substrate, a hydrophilic blocking layer, and a porous polar polymer bonding layer. The hydrophilic blocking layer is disposed
(Continued)

between the porous substrate and the porous polar polymer bonding layer. Pore walls in the porous polar polymer bonding layer are provided with node structures.

15 Claims, 8 Drawing Sheets

(51) Int. Cl.
| | |
|---|---|
| *H01M 50/457* | (2021.01) |
| *H01M 50/446* | (2021.01) |
| *H01M 50/451* | (2021.01) |
| *H01M 50/434* | (2021.01) |
| *H01M 50/489* | (2021.01) |
| *H01M 50/443* | (2021.01) |
| *H01M 50/426* | (2021.01) |
| *H01M 50/42* | (2021.01) |
| *H01M 10/0525* | (2010.01) |

(52) U.S. Cl.
CPC ....... *H01M 50/426* (2021.01); *H01M 50/434* (2021.01); *H01M 50/443* (2021.01); *H01M 50/446* (2021.01); *H01M 50/451* (2021.01); *H01M 50/457* (2021.01); *H01M 50/489* (2021.01); *H01M 10/0525* (2013.01)

(58) Field of Classification Search
USPC .......................................... 429/144, 251, 254
See application file for complete search history.

(56) References Cited

U.S. PATENT DOCUMENTS

| | | | | |
|---|---|---|---|---|
| 2015/0263325 | A1* | 9/2015 | Honda | H01M 50/451 429/144 |
| 2015/0380707 | A1* | 12/2015 | Iwai | H01M 50/44 429/145 |
| 2016/0028067 | A1* | 1/2016 | Pekala | H01M 50/489 156/247 |
| 2017/0117521 | A1* | 4/2017 | Sasaki | H01M 4/366 |
| 2018/0123106 | A1* | 5/2018 | Shin | H01M 50/461 |
| 2018/0309108 | A1* | 10/2018 | Shin | H01M 50/491 |

FOREIGN PATENT DOCUMENTS

| | | | | |
|---|---|---|---|---|
| CN | 202888296 U | | 4/2013 | |
| CN | 103603178 A | | 2/2014 | |
| CN | 103814459 A | | 5/2014 | |
| CN | 104956518 A | | 9/2015 | |
| EP | 2889934 A1 | | 7/2015 | |
| JP | H0528982 A | | 2/1993 | |
| JP | 2011071009 A | | 5/2011 | |
| JP | 2011100635 A | | 5/2011 | |
| JP | 2014175121 A | * | 9/2014 | |
| KR | 1020040033038 A | | 4/2004 | |
| KR | 1020040050419 A | | 4/2011 | |
| KR | 1020120130177 A | | 11/2012 | |
| KR | 101338131 B1 | | 12/2013 | |
| KR | 2016041492 A | * | 4/2016 | .......... H01M 10/052 |
| KR | 2017024574 A | * | 3/2017 | .......... H01M 10/052 |
| WO | WO-2014079177 A1 | * | 5/2014 | ........... C08F 220/06 |
| WO | 2017047576 A1 | | 3/2017 | |
| WO | WO-2017171524 A1 | * | 10/2017 | ........... H01M 10/04 |
| WO | WO-2022111580 A1 | * | 6/2022 | |

OTHER PUBLICATIONS

KSA, Certificate of Approval, 2020, LG Chem, 1-4 (Year: 2020).*
The World Intellectual Property Organization (WIPO) International Search Report for PCT/CN2019/074196 dated Apr. 2, 2019 5 Pages.

* cited by examiner

SEPARATOR INCLUDING SUBSTRATE, HYDROPHILIC BLOCKING LAYER, AND POLAR POLYMER BONDING WITH NODAL STRUCTURE, AND METHOD OF PREPARING THE SAME

CROSS-REFERENCE TO RELATED APPLICATIONS

This application is a national phase entry under 35 U.S.C. § 371 of International Application No. PCT/CN2019/074196, filed on Jan. 31, 2019, which claims a priority to and benefits of Chinese Patent Application Serial No. 201810119665.2, filed with the State Intellectual Property Office of P. R. China on Feb. 6, 2018, the entire content of all of which is incorporated herein by reference.

FIELD

The present disclosure relates to a polymer separator and preparation method and use thereof, and the present disclosure also relates to a lithium-ion battery using the polymer separator and preparation method thereof.

BACKGROUND

A lithium-ion battery mainly includes cathode/anode material, an electrolyte, a separator, and a battery casing packaging material. The separator is an important part of the lithium-ion battery, and is configured to separate the cathode and the anode to prevent a short circuit in the battery. The separator allows electrolyte ions to freely pass through, thus completing electrochemical charge and discharge processes. The performance of the separator determines the interface structure, internal resistance and the like, and directly influences the characteristics such as rate performance, cycle performance, and safety performance (high temperature resistance) of the battery. A separator with excellent performance plays an important role in improving the overall performance of the battery.

With the characteristics such as low raw material cost, simple preparation process, high mechanical strength, and high electrochemical stability, currently polyethylene and polypropylene microporous membranes prepared by mechanical stretching method are main commercially available separators for lithium-ion batteries. However, blocking and narrowing of pores on commercially available microporous membranes at around the melting temperature causes the battery to short-circuit, which makes the battery have the risk of burning and explosion at high temperature. In addition, polyolefin separators have poor adsorption capacity for the electrolytic solution, which is not conducive to the conduction of lithium ions during charging and discharging.

At present, coating a porous membrane of a polar polymer such as polyethers (such as polyethylene oxide), polyacrylonitriles, polyacrylates (such as polymethyl methacrylate and its copolymers), polyvinylidene fluoride polymers (including polyvinylidene difluoride, and copolymers of vinylidene fluoride and hexafluoropropylene) on both sides of the polyolefin microporous membrane is the main method for improving the adsorption capacity of the separator for the electrolytic solution and reducing the shrinkage ratio of the microporous membrane at around the melting temperature. A phase inversion process is one of the mainly methods for preparing porous membranes, which includes two forms: (1) phase separation via solvent evaporation-induced precipitation; (2) phase separation via immersion precipitation.

In actual production, the polyvinylidene fluoride (PVdF) coating technology has been widely used. The polyvinylidene fluoride (PVdF) coating technology adopts phase separation via evaporation-induced precipitation to form pores on the surface of the polyolefin microporous membrane to obtain a PVdF porous membrane, and specifically includes the following operations: dissolving or dispersing polyvinylidene fluoride in acetone, adding a certain amount of pore-forming agent DMC (dimethyl carbonate) to form a slurry, coating the slurry on the surface of polyolefin microporous membrane, and drying. During drying, the latent solvent acetone is removed by evaporation first, and then the pore-forming agent DMC is removed by evaporation, thus forming pores.

SUMMARY

The operational safety of the existing polyvinylidene fluoride (PVdF) coating technology, which uses acetone having a low boiling point as the solvent, needs to be improved. The inventors of the present disclosure have found during the course of the study that although the use of high-boiling solvents instead of acetone can improve the operational safety, the performance of lithium-ion batteries prepared by using high-boiling solvents to prepare polyvinylidene fluoride polymer solutions is significantly reduced. It is found through research that the reasons may be that the polyvinylidene fluoride polymer solution prepared with a high-boiling solvent is extremely permeable, and the polymer solution easily penetrates the separator to reach the other surface opposite to the coating surface, carrying the polyvinylidene fluoride polymer into the pores of the separator; because the fluidity and permeability of the polyvinylidene fluoride polymer is much lower than those of the organic solvent, the polyvinylidene fluoride polymer carried into the separator by the organic solvent usually remains in the pores of the separator and blocks the separator, adversely affecting the permeability and porosity of the separator, increasing the bulk impedance of the polymer separator, reducing the ionic conductivity, and adversely affecting the performance of the ultimately prepared lithium-ion battery. Although a ceramic layer is usually formed on the surface of the existing polyolefin separator to improve the thermal stability of the separator and the adsorption capacity of the separator for the electrolytic solution, the polyolefin separator having the ceramic layer cannot prevent the polymer solution from penetrating the separator.

The inventors of the present disclosure have conducted extensive studies on the problems of the preparation of polyvinylidene fluoride polymer solutions using high-boiling solvents and found that in the preparation of polyvinylidene fluoride polymer solutions using high-boiling solvents, disposing a hydrophilic blocking layer between the porous substrate (that is, a polyolefin porous film with or without a ceramic layer) and the polyvinylidene fluoride polymer can effectively suppress the penetration of the polyvinylidene fluoride polymer solution into the porous substrate through the hydrophilic blocking layer, thereby effectively reducing the amount of the polyvinylidene fluoride polymer entering the porous substrate, increasing the permeability and porosity of the polymer separator, reducing the bulk impedance of the polymer separator, and increasing the ionic conductivity of the polymer separator, so that the prepared lithium-ion battery still has good performance. The present disclosure has been accomplished on this basis.

According to a first aspect of the present disclosure, the present disclosure provides a polymer separator. The polymer separator includes a porous substrate, a hydrophilic blocking layer, and a porous polar polymer bonding layer. The hydrophilic blocking layer is disposed between the porous substrate and the porous polar polymer bonding layer. Pore walls in the porous polar polymer bonding layer are provided with node structures.

According to a second aspect of the present disclosure, the present disclosure provides a method for preparing a polymer separator, the method including:

(1) coating a hydrophilic blocking slurry onto at least one surface of a porous substrate to form a hydrophilic blocking coating, where the hydrophilic blocking slurry contains a dispersion medium, and hydrophilic inorganic particles and a binder which are dispersed in the dispersion medium, and optionally drying the hydrophilic blocking coating to form a hydrophilic blocking layer;

(2) coating a polar polymer binder solution onto a surface of the hydrophilic blocking coating or the hydrophilic blocking layer to form a polar polymer binder coating, where the polar polymer binder solution contains an organic solvent, and a polar polymer binder and a pore-forming agent which are dissolved in the organic solvent; and (3) drying the hydrophilic blocking coating and the polar polymer binder coating to form a hydrophilic blocking layer and a porous polar polymer bonding layer, or drying the polar polymer binder coating to form a porous polar polymer bonding layer.

According to a third aspect of the present disclosure, the present disclosure provides a polymer separator prepared by the method according to the second aspect of the present disclosure.

According to a fourth aspect of the present disclosure, the present disclosure provides use of a polymer separator according to the first or third aspect of the present disclosure in a lithium-ion battery.

According to a fifth aspect of the present disclosure, the present disclosure provides a lithium-ion battery, including a cathode, an anode, and a polymer separator, where the polymer separator is a polymer separator according to the first or third aspect of the present disclosure.

According to a sixth aspect of the present disclosure, the present disclosure provides a method for preparing a lithium-ion battery, the method including:

S1. preparing a polymer separator by the method according to the second aspect of the present disclosure;

S2. disposing the polymer separator between a cathode and an anode to form a battery cell, followed by packaging.

When used in a lithium-ion battery, the polymer separator according to the present disclosure can be firmly bonded to the cathode and the anode of the lithium-ion battery, and the high bonding strength to the cathode and the anode enables the lithium-ion battery to have a high hardness. A lithium-ion battery using the polymer separator of the present disclosure exhibits high performance.

In the method for preparing a polymer separator according to the present disclosure, the polar polymer binder solution may be formulated by using a low-boiling solvent (such as acetone) in existing processes, or by using a high-boiling solvent with higher operational safety, or by using a mixture of a low-boiling solvent and a high-boiling solvent. The use of a high-boiling solvent can improve the operational safety without significantly reducing the performance of the lithium-ion battery.

Additional aspects and advantages of the present disclosure will be partly given in and partly apparent from the description below, or understood through practice of the present disclosure.

BRIEF DESCRIPTION OF THE DRAWINGS

FIG. 1A is a photograph taken at 500-fold magnification and FIG. 1B is a photograph taken at 5000-fold magnification;

FIG. 2A is a photograph taken at 500-fold magnification and FIG. 2B is a photograph taken at 5000-fold magnification;

FIG. 3A is a photograph taken at 500-fold magnification and FIG. 3B is a photograph taken at 5000-fold magnification;

FIG. 4A is a photograph taken at 500-fold magnification and FIG. 4B is a photograph taken at 5000-fold magnification;

FIG. 5A is a photograph taken at 500-fold magnification and FIG. 5B is a photograph taken at 5000-fold magnification;

FIG. 6A is a photograph taken at 500-fold magnification and FIG. 6B is a photograph taken at 5000-fold magnification;

DETAILED DESCRIPTION

Figure 1A:
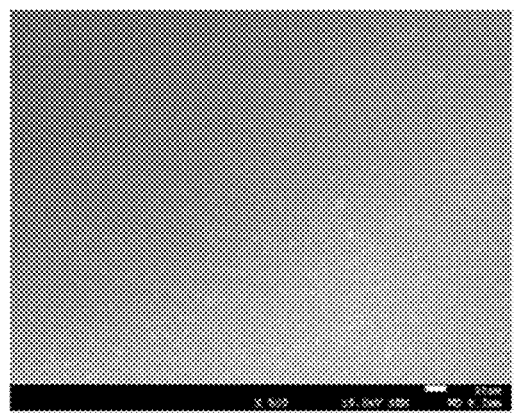
FIG. 1A and FIG. 1B are SEM images showing the surface morphology of a hydrophilic blocking layer of a polymer separator prepared in Embodiment 1-1, where

The endpoints and any values of the ranges disclosed herein are not limited to the precise range or value, and these ranges or values should be understood to include values close to these ranges or values. A numerical range between endpoint values of each range, a numerical range between an endpoint value and an individual point value of each range, and a numerical range between individual point values may be combined with each other to obtain one or more new numerical ranges, and such numerical ranges should be considered to be specifically disclosed herein.

According to a first aspect of the present disclosure, the present disclosure provides a polymer separator. The polymer separator includes a porous substrate, a hydrophilic blocking layer, and a porous polar polymer bonding layer. The hydrophilic blocking layer is disposed between the porous substrate and the porous polar polymer bonding layer.

The hydrophilic blocking layer is a blocking layer having hydrophilicy. According to the polymer separator of the present disclosure, a water contact angle of the hydrophilic blocking layer may be not greater than 40°, and is, for example, 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, or 40°. Preferably, the water contact angle of the hydrophilic blocking layer is 20° or below. When the water contact angle of the hydrophilic blocking layer is 20° or below, the performance of the polymer separator can be more significantly improved, for example, the permeability and ionic conductivity of the polymer separator can be more significantly improved, so that lithium-ion batteries using the polymer separator exhibit more excellent performance. More preferably, the water contact angle of the hydrophilic blocking layer is 2-15°, and preferably 5-10°. The contact angle is measured using a method specified in GB/T 30693-2014 "Measurement of water-contact angle of plastic films".

The hydrophilic blocking layer contains a binder and hydrophilic inorganic particles. The hydrophilic inorganic particles are bonded to each other by the binder.

The hydrophilic inorganic particles are selected from at least one of hydrophilic $Al_2O_3$, hydrophilic $SiO_2$, hydrophilic $SnO_2$, hydrophilic $ZrO_2$, hydrophilic $TiO_2$, hydrophilic SiC, hydrophilic $Si_3N_4$, hydrophilic CaO, hydrophilic MgO, hydrophilic ZnO, hydrophilic $BaTiO_3$, hydrophilic $LiAlO_2$ and hydrophilic $BaSO_4$, for example, the hydrophilic inorganic particles are preferably one or more of hydrophilic $Al_2O_3$, hydrophilic Sift, hydrophilic $SnO_2$, hydrophilic $ZrO_2$, hydrophilic $TiO_2$, hydrophilic SiC, hydrophilic $Si_3N_4$, hydrophilic CaO, hydrophilic MgO, hydrophilic ZnO, hydrophilic $BaTiO_3$, hydrophilic $LiAlO_2$ and hydrophilic $BaSO_4$. More preferably, the hydrophilic inorganic particles are hydrophilic $Al_2O_3$ and/or hydrophilic $SiO_2$. Further preferably, the hydrophilic inorganic particles are selected from at least one of gas-phase hydrophilic $SiO_2$, precipitated hydrophilic $SiO_2$, and gas-phase hydrophilic $Al_2O_3$. For example, the hydrophilic inorganic particles are one or more of gas-phase hydrophilic $SiO_2$, precipitated hydrophilic $SiO_2$, and gas-phase hydrophilic $Al_2O_3$.

The hydrophilic inorganic particles may have a particle size of 1 nm to 10 µm, preferably 1 nm to 5 µm, and more preferably 1 nm to 2 µm. To further improve the permeability and ionic conductivity of the polymer separator and the performance of the lithium-ion battery using the polymer separator, the particle size of the hydrophilic inorganic particles is more preferably 10 nm to 1 µm, further preferably 20 nm to 800 nm, and still further preferably 50 nm to 350 nm. The particle size is a volume mean particle size measured using a laser particle size analyzer.

The hydrophilic inorganic particles may have a specific surface area of 10-600 $m^2/g$. To further improve the permeability and ionic conductivity of the polymer separator and the performance of the lithium-ion battery using the polymer separator, the specific surface area of the hydrophilic inorganic particles is preferably 100-500 $m^2/g$, more preferably 150-400 $m^2/g$, further preferably 200-400 $m^2/g$, still further preferably 250-390 $m^2/g$, and especially preferably 300-380 $m^2/g$. The specific surface area is measured using a method specified in GB/T 19587-2004 "Determination of the specific surface area of solids by gas adsorption using the BET method".

According to the polymer separator of the present disclosure, based on the total amount of the hydrophilic blocking layer, the content of the hydrophilic inorganic particles may be 50-95 wt %, preferably 70-95 wt %, more preferably 80-95 wt %, and further preferably 85-95 wt %.

The binder is not only used for bonding and fixing the hydrophilic inorganic particles, but also can further improve the adsorption capacity of the polymer separator for the electrolytic solution. The binder is selected from at least one of an acrylate polymer, a styrene-acrylate copolymer, polyvinylidene fluoride, a vinylidene fluoride-hexafluoropropylene copolymer, an acrylonitrile-acrylate copolymer, a vinyl chloride-acrylate copolymer, and a butadiene-styrene copolymer, and is preferably one or more of an acrylate polymer, a styrene-acrylate copolymer, polyvinylidene fluoride, a vinylidene fluoride-hexafluoropropylene copolymer, an acrylonitrile-acrylate copolymer, a vinyl chloride-acrylate copolymer, and a butadiene-styrene copolymer.

According to the polymer separator of the present disclosure, the hydrophilic blocking layer may have a thickness of 0.1-3 µm, for example, 0.1 µm, 0.2 µm, 0.3 µm, 0.4 µm, 0.5 µm, 0.6 µm, 0.7 µm, 0.8 µm, 0.9 µm, 1 µm, 1.1 µm, 1.2 µm, 1.3 µm, 1.4 µm, 1.5 µm, 1.6 µm, 1.7 µm, 1.8 µm, 1.9 µm, 2 µm, 2.1 µm, 2.2 µm, 2.3 µm, 2.4 µm, 2.5 µm, 2.6 µm, 2.7 µm, 2.8 µm, 2.9 µm, or 3 µm. Preferably, the hydrophilic blocking layer has a thickness of 0.1-1 µm, and more preferably 0.3-0.8 µm.

According to the polymer separator of the present disclosure, the porous substrate includes a porous polymer layer, and may be used for swelling of the electrolytic solution and transmission of lithium ions. Preferably, the porous polymer layer is a porous polyolefin layer. For example, the porous polymer layer is selected from at least one of a porous polyethylene layer, a porous polypropylene layer, and a porous polyethylene-polypropylene composite layer, and preferably one or more of a porous polyethylene (PE) layer, a porous polypropylene (PP) layer, and a porous polyethylene-polypropylene composite layer. The porous polyethylene-polypropylene composite layer may be a PE/PP/PE composite substrate layer.

According to the polymer separator of the present disclosure, the porous polymer layer may have a thickness of 1-50 µm, for example, 1 µm, 2 µm, 3 µm, 4 µm, 5 µm, 6 µm, 7 µm, 8 µm, 9 µm, 10 µm, 11 µm, 12 µm, 13 µm, 14 µm, 15 µm, 16 µm, 17 µm, 18 µm, 19 µm, 20 µm, 21 µm, 22 µm, 23 µm, 24 µm, 25 µm, 26 µm, 27 µm, 28 µm, 29 µm, 30 µm, 31 µm, 32 µm, 33 µm, 34 µm, 35 µm, 36 µm, 37 µm, 38 µm, 39 µm, 40 µm, 41 µm, 42 µm, 43 µm, 44 µm, 45 µm, 46 µm, 47 µm, 48 µm, 49 µm, or 50 µm, preferably 5-20 µm, and more preferably 8-15 µm.

According to the polymer separator of the present disclosure, the porous substrate may further include a ceramic layer. The ceramic layer is used for improving the thermal stability, mechanical properties, and electrolytic solution adsorption capacity of the porous polymer layer. Ceramic particles in the ceramic layer may be formed by sintering of at least one of $Al_2O_3$, $SiO_2$, $SnO_2$, $ZrO_2$, $TiO_2$, SiC, $Si_3N_4$, CaO, MgO, ZnO, $BaTiO_3$, $LiAlO_2$ and $BaSO_4$, and are preferably formed by sintering of one or more of $Al_2O_3$, $SiO_2$, $SnO_2$, $ZrO_2$, $TiO_2$, SiC, $Si_3N_4$, CaO, MgO, ZnO, $BaTiO_3$, $LiAlO_2$ and $BaSO_4$. Generally, the ceramic layer may have a thickness of 1-5 µm, for example, 1 µm, 1.1 µm, 1.2 μm, 1.3 μm, 1.4 μm, 1.5 μm, 1.6 μm, 1.7 μm, 1.8 μm, 1.9 μm, 2.0 μm, 2.1 μm, 2.2 μm, 2.3 μm, 2.4 μm, 2.5 μm, 2.6 μm, 2.7 μm, 2.8 μm, 2.9 μm, 3 μm, 3.1 μm, 3.2 μm, 3.3 μm, 3.4 μm, 3.5 μm, 3.6 μm, 3.7 μm, 3.8 μm, 3.9 μm, 4.0 μm, 4.1 μm, 4.2 μm, 4.3 μm, 4.4 μm, 4.5 μm, 4.6 μm, 4.7 μm, 4.8 μm, 4.9 μm, or 5.0 μm, and preferably 1.5-3 μm. Preferably, the thickness of the ceramic layer is greater than the thickness of the hydrophilic blocking layer.

When the polymer separator of the present disclosure includes a ceramic layer, the ceramic layer may be disposed between the porous polymer layer and the hydrophilic blocking layer, or the porous polymer layer may be disposed between the ceramic layer and the hydrophilic blocking layer, or a combination of the two configurations may be used. That means, the porous substrate comprises a porous polymer layer and a ceramic layer, wherein the ceramic layer is disposed on one surface of the porous polymer layer, wherein the hydrophilic blocking layer is disposed on one surface of the ceramic layer away from the porous polymer layer, or the hydrophilic blocking layer is disposed on one surface of the porous polymer layer not providing with ceramic layer, or the hydrophilic blocking layer is disposed both on a surface of the ceramic layer away from the porous polymer layer and on a surface of the porous polymer layer not providing with ceramic layer. Or the porous substrate comprises a porous polymer layer and a ceramic layer, wherein the ceramic layer is disposed on both surfaces of the porous polymer layer, wherein the hydrophilic blocking layer is disposed at least one ceramic layer on the surface away from the porous polymer layer.

According to the polymer separator of the present disclosure, the porous polar polymer bonding layer is used for reducing the shrinkage ratio of the porous substrate at around the melting temperature, provides a bonding effect to bond together the polymer separator and a cathode or anode of a battery, and can also improve the adsorption capacity of the porous substrate for the electrolytic solution. The polar polymer in the porous polar polymer bonding layer may be a polar polymer capable of achieving the above functions. Specific examples may include, but not limited to, selected from at least one of polyvinylidene fluoride, a vinylidene fluoride-hexafluoropropylene copolymer, and a vinylidene fluoride-acrylate copolymer, preferably include, but not limited to, selected from at least one of polyvinylidene fluoride, a vinylidene fluoride-hexafluoropropylene copolymer, and a vinylidene fluoride-acrylate copolymer, and more preferably include, but not limited to, one or more of polyvinylidene fluoride (PVdF), a vinylidene fluoride-hexafluoropropylene copolymer (P(VdF-HFP)), and a vinylidene fluoride-acrylate copolymer.

The porous polar polymer bonding layer may have a thickness of 0.1-10 preferably 0.2-5 more preferably 0.7-3 and further preferably 0.8-1.5 μm.

Figure 6A:
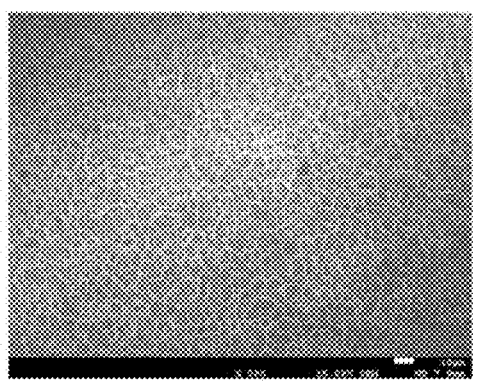
FIG. 6A and FIG. 6B are SEM images showing the surface morphology of a polymer separator prepared in Comparative Example 3, where
Figure 6B:
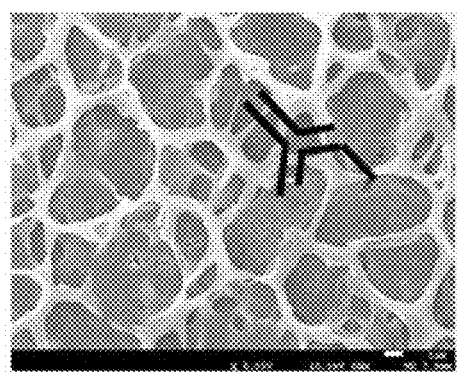

According to the polymer separator of the present disclosure, Pore walls in the porous polar polymer bonding layer are provided with node structures, that is, pore walls between pores in the porous polar polymer bonding layer are provided with node structures. Nodes in the node structure may protrude from the pore wall (i.e., protrude relative to the pore wall surface), or may not protrude from the pore wall (i.e., not protrude relative to the pore wall surface). It should be noted that the "node structure" herein may be construed as a mesh structure shown in FIG. 4B, where mesh walls consist of spherical particles or are partially composed of spherical particles. The spherical particles are essentially spheres formed by secondary precipitation resulting from changes in some particular conditions such as temperature and humidity after PVDF is dissolved in the solvent (where the spheres are different from those of commercial PVDF particles). FIG. 6B shows an ordinary mesh structure having smooth walls, where there is no spherical particle and therefore no node structure.

According to the polymer separator of the present disclosure, the hydrophilic blocking layer and the porous polar polymer bonding layer may be disposed on one surface of the porous substrate, or may be disposed on two surfaces of the porous substrate. Preferably, the porous polar polymer bonding layer is attached to the surface of the hydrophilic blocking layer.

According to the polymer separator of the present disclosure, in an implementation, the polymer separator consists of a porous substrate, a hydrophilic blocking layer, and a porous polar polymer bonding layer, and the porous substrate is a porous polymer layer. The hydrophilic blocking layer is attached to the surface of the porous substrate, and the porous polar polymer bonding layer is attached to the surface of the hydrophilic blocking layer. According to this implementation, the hydrophilic blocking layer and the porous polar polymer bonding layer may be disposed in sequence on one surface of the porous substrate (i.e., the polymer separator has the following structure: porous polymer layer|hydrophilic blocking layer|porous polar polymer bonding layer), or the hydrophilic blocking layer and the porous polar polymer bonding layer may be disposed in sequence on each of two opposite surfaces of the porous substrate (i.e., the polymer separator has the following structure: porous polar polymer bonding layer|hydrophilic blocking layer|porous polymer layer|hydrophilic blocking layer|porous polar polymer bonding layer).

According to the polymer separator of the present disclosure, in another implementation, the polymer separator consists of a porous substrate, a hydrophilic blocking layer, and a porous polar polymer bonding layer, and the porous substrate consists of a porous polymer layer and a ceramic layer. According to this implementation, in an example, the ceramic layer is attached to the surface of the porous polymer layer, the hydrophilic blocking layer is attached to the surface of the ceramic layer, the porous polar polymer bonding layer is attached to the surface of the hydrophilic blocking layer (i.e., the polymer separator has the following structure: porous polymer layer|ceramic layer|hydrophilic blocking layer|porous polar polymer bonding layer). In another example, the porous polymer layer is attached to the surface of the ceramic layer, the hydrophilic blocking layer is attached to the surface of the porous polymer layer, the porous polar polymer bonding layer is attached to the surface of the hydrophilic blocking layer (i.e., the polymer separator has the following structure: ceramic layer|porous polymer layer|hydrophilic blocking layer|porous polar polymer bonding layer). In still another example, the ceramic layer is attached to the surface of the porous polymer layer, and the hydrophilic blocking layer and the porous polar polymer bonding layer are attached in sequence to the other surface of the ceramic layer and the other surface of the porous polymer layer (i.e., the polymer separator has the following structure: porous polar polymer bonding layer|hydrophilic blocking layer|ceramic layer|porous polymer layer|hydrophilic blocking layer|porous polar polymer bonding layer).

According to the polymer separator of the present disclosure, the total thickness of the polymer separator may be conventional, and generally may be 5-50 μm, preferably 8-30 μm, and more preferably 10-20 μm.

The polymer separator of the present disclosure has high permeability. Generally, the polymer separator of the present disclosure has a Gurley value of 100-900 Sec/100 mL, preferably 120-600 Sec/100 mL, and more preferably 120-500 Sec/100 mL. Further preferably, the Gurley value of the polymer separator is 150-350 Sec/100 mL, for example, 200-300 Sec/100 mL.

As compared with a ceramic layer used in an existing polymer separator to improve the thermal stability and electrolytic solution adsorption capacity of the separator, the hydrophilic blocking layer in the polymer separator of the present disclosure is more hydrophilic and can effectively block the polar polymer from entering the porous substrate during preparation. As compared with the existing polymer separator, according to the polymer separator of the present disclosure, pores in the porous polar polymer bonding layer have a larger pore size (the pore size of pores in the porous polar polymer bonding layer of the existing polymer separator is generally 0.5-1 µm, and the pore size of pores in the porous polar polymer bonding layer of the polymer separator of the present disclosure may be 3 µm or above, and generally 3-10 µm), the porous polar polymer bonding layer is a multi-layer interwoven screen structure, and part of the surface of the hydrophilic blocking layer is exposed through the multi-layer interwoven screen structure; however, the porous polar polymer bonding layer of the existing polymer separator is more compact and is honeycomb-like.

According to a second aspect of the present disclosure, the present disclosure provides a method for preparing a polymer separator, the method including:

(1) coating a hydrophilic blocking slurry onto at least one surface of a porous substrate to form a hydrophilic blocking coating, and optionally drying the hydrophilic blocking coating to form a hydrophilic blocking layer;

(2) coating a polar polymer binder solution onto a surface of the hydrophilic blocking coating or the hydrophilic blocking layer to form a polar polymer binder coating; and (3) drying the hydrophilic blocking coating and the polar polymer binder coating to form a hydrophilic blocking layer and a porous polar polymer bonding layer, or drying the polar polymer binder coating to form a porous polar polymer bonding layer.

The porous substrate may be a porous polymer film, or a composite film of a porous polymer film and a ceramic film. The porous polymer film is preferably a porous polyolefin film. For example, the porous polymer layer is selected from at least one of a porous polyethylene layer, a porous polypropylene layer, and a porous polyethylene-polypropylene composite layer, and preferably one or more of a porous polyethylene (PE) film, a porous polypropylene (PP) film, and a porous polyethylene-polypropylene composite film. The porous polyethylene-polypropylene composite film may be a PE/PP/PE composite substrate film. Ceramic particles in the ceramic film may be formed by sintering of at least one of $Al_2O_3$, $SiO_2$, $SnO_2$, $ZrO_2$, $TiO_2$, SiC, $Si_3N_4$, CaO, MgO, ZnO, $BaTiO_3$, $LiAlO_2$ and $BaSO_4$, and are preferably formed by sintering of one or more of $Al_2O_3$, $SiO_2$, $SnO_2$, $ZrO_2$, $TiO_2$, SiC, $Si_3N_4$, CaO, MgO, ZnO, $BaTiO_3$, $LiAlO_2$ and $BaSO_4$. In the composite film, the porous polymer film may have a thickness of 1-50 µm, for example, 1 µm, 2 µm, 3 µm, 4 µm, 5 µm, 6 µm, 7 µm, 8 µm, 9 µm, 10 µm, 11 µm, 12 µm, 13 µm, 14 µm, 15 µm, 16 µm, 17 µm, 18 µm, 19 µm, 20 µm, 21 µm, 22 µm, 23 µm, 24 µm, 25 µm, 26 µm, 27 µm, 28 µm, 29 µm, 30 µm, 31 µm, 32 µm, 33 µm, 34 µm, 35 µm, 36 µm, 37 µm, 38 µm, 39 µm, 40 µm, 41 µm, 42 µm, 43 µm, 44 µm, 45 µm, 46 µm, 47 µm, 48 µm, 49 µm, or 50 µm, preferably 5-20 µm, and more preferably 8-15 µm. The ceramic film may have a thickness of 1-5 µm, and preferably 1.5-3 µm.

In step (1), the hydrophilic blocking slurry contains a dispersion medium, and hydrophilic inorganic particles and a binder which are dispersed in the dispersion medium.

The hydrophilic inorganic particles may have a particle size of 1 nm to 10 µm, preferably 1 nm to 5 µm, and more preferably 1 nm to 2 µm. To further improve the permeability and ionic conductivity of the ultimately prepared polymer separator and the performance of the lithium-ion battery using the polymer separator, the particle size of the hydrophilic inorganic particles is more preferably 1 nm to 2 µm, further preferably 10 nm to 1 µm, still further preferably 20 nm to 800 nm, and especially preferably 50 nm to 350 nm.

The hydrophilic inorganic particles may have a specific surface area of 10-600 $m^2/g$. To further improve the permeability and ionic conductivity of the ultimately prepared polymer separator and the performance of the lithium-ion battery using the polymer separator, the specific surface area of the hydrophilic inorganic particles is preferably 100-500 $m^2/g$, more preferably 150-400 $m^2/g$, further preferably 200-400 $m^2/g$, still further preferably 250-390 $m^2/g$, and especially preferably 300-380 $m^2/g$.

The hydrophilic inorganic particles are selected from at least one of hydrophilic $Al_2O_3$, hydrophilic $SiO_2$, hydrophilic $SnO_2$, hydrophilic $ZrO_2$, hydrophilic $TiO_2$, hydrophilic SiC, hydrophilic $Si_3N_4$, hydrophilic CaO, hydrophilic MgO, hydrophilic ZnO, hydrophilic $BaTiO_3$, hydrophilic $LiAlO_2$ and hydrophilic $BaSO_4$. For example, specific examples of the hydrophilic inorganic particles may include, but not limited to, one or more of hydrophilic $Al_2O_3$, hydrophilic $SiO_2$, hydrophilic $SnO_2$, hydrophilic $ZrO_2$, hydrophilic $TiO_2$, hydrophilic SiC, hydrophilic $Si_3N_4$, hydrophilic CaO, hydrophilic MgO, hydrophilic ZnO, hydrophilic $BaTiO_3$, hydrophilic $LiAlO_2$ and hydrophilic $BaSO_4$. Preferably, the hydrophilic inorganic particles are hydrophilic $Al_2O_3$ and/or hydrophilic $SiO_2$. More preferably, the hydrophilic inorganic particles are selected from at least one of gas-phase hydrophilic $SiO_2$, precipitated hydrophilic $SiO_2$, and gas-phase hydrophilic $Al_2O_3$. For example, the hydrophilic inorganic particles are one or more of gas-phase hydrophilic $SiO_2$, precipitated hydrophilic $SiO_2$, and gas-phase hydrophilic $Al_2O_3$.

In the hydrophilic blocking slurry, the binder is selected from at least one of an acrylate polymer, a styrene-acrylate copolymer, polyvinylidene fluoride, a vinylidene fluoride-hexafluoropropylene copolymer, an acrylonitrile-acrylate copolymer, a vinyl chloride-acrylate copolymer, and a butadiene-styrene copolymer, and is preferably one or more of an acrylate polymer, a styrene-acrylate copolymer, polyvinylidene fluoride, a vinylidene fluoride-hexafluoropropylene copolymer, an acrylonitrile-acrylate copolymer, a vinyl chloride-acrylate copolymer, and a butadiene-styrene copolymer.

In the hydrophilic blocking slurry, the dispersion medium may be selected according to the types of the hydrophilic inorganic particles and the binder, such that the dispersion medium can cause the hydrophilic inorganic particles and the binder to form a uniform stable slurry. Specific examples of the dispersion medium may include, but not limited to, selected from at least one of water, ethanol, isopropanol, cyclohexane, tetrahydrofuran, dichloromethane and chloroform, and preferably include, but not limited to, one or more of water, ethanol, isopropanol, cyclohexane, tetrahydrofuran, dichloromethane and chloroform.

In the hydrophilic blocking slurry, the content of the hydrophilic inorganic particles may be 50-95 wt %, for example, 50 wt %, 52 wt %, 55 wt %, 57 wt %, 60 wt %, 62 wt %, 65 wt %, 67 wt %, 70 wt %, 72 wt %, 75 wt %, 77 wt %, 80 wt %, 82 wt %, 85 wt %, 87 wt %, 90 wt %, 92 wt %, or 95 wt %, and is preferably 70-95 wt %, more preferably 80-95 wt %, and further preferably 85-95 wt %. The amount of the binder may be selected according to the amount of the hydrophilic inorganic particles, such that the hydrophilic inorganic particles can bonded and fixed. Generally, in the hydrophilic blocking slurry, relative to 100 parts by weight of the hydrophilic inorganic particles, the content of the binder may be 1-30 parts by weight, for example, 1 part by weight, 2 parts by weight, 5 parts by weight, 7 parts by weight, 10 parts by weight, 12 parts by weight, 15 parts by weight, 17 parts by weight, 20 parts by weight, 22 parts by weight, 25 parts by weight, 27 parts by weight, or 30 parts by weight, and is preferably 2-25 parts by weight, and more preferably 5-20 parts by weight.

The hydrophilic blocking slurry may further contain a dispersant to further improve the stability of the hydrophilic blocking slurry. The dispersant may be a common substance that can promote the dispersion of inorganic particles in a liquid medium, and specific examples may include, but not limited to, polyvinyl alcohol (PVA) and/or sodium polyacrylate (PAANa). The amount of the dispersant may be conventional. Generally, relative to 100 parts by weight of the hydrophilic inorganic particles, the amount of the dispersant may be 0.1-10 parts by weight, for example, 0.1 parts by weight, 0.2 parts by weight, 0.3 parts by weight, 0.5 parts by weight, 0.7 parts by weight, 1.0 parts by weight, 1.2 parts by weight, 1.5 parts by weight, 1.7 parts by weight, 2.0 parts by weight, 2.2 parts by weight, 2.5 parts by weight, 2.7 parts by weight, 3.0 parts by weight, 3.2 parts by weight, 3.5 parts by weight, 3.7 parts by weight, 4.0 parts by weight, 4.2 parts by weight, 4.5 parts by weight, 4.7 parts by weight, 5.0 parts by weight, 5.2 parts by weight, 5.5 parts by weight, 5.7 parts by weight, 6.0 parts by weight, 6.2 parts by weight, 6.5 parts by weight, 6.7 parts by weight, 7.0 parts by weight, 7.2 parts by weight, 7.5 parts by weight, 7.7 parts by weight, 8.0 parts by weight, 8.2 parts by weight, 8.5 parts by weight, 8.7 parts by weight, 9.0 parts by weight, 9.2 parts by weight, 9.5 parts by weight, 9.7 parts by weight, or 10.0 parts by weight, and is preferably 0.2-5 parts by weight, and more preferably 0.3-2 parts by weight.

The hydrophilic blocking slurry may further contain a thickener to further improve the coatability of the hydrophilic blocking slurry. The thickener may be a cellulose-based thickener and/or a polyacrylate-based alkali-swellable thickener (e.g., BASF Latekoll® D thickener). Relative to 100 parts by weight of the hydrophilic inorganic particles, the amount of the thickener may be 0.1-10 parts by weight, for example, 0.1 parts by weight, 0.2 parts by weight, 0.3 parts by weight, 0.5 parts by weight, 0.6 parts by weight, 0.7 parts by weight, 0.8 parts by weight, 1.0 parts by weight, 1.2 parts by weight, 1.5 parts by weight, 1.7 parts by weight, 2.0 parts by weight, 2.2 parts by weight, 2.5 parts by weight, 2.7 parts by weight, 3.0 parts by weight, 3.2 parts by weight, 3.5 parts by weight, 3.7 parts by weight, 4.0 parts by weight, 4.2 parts by weight, 4.5 parts by weight, 4.7 parts by weight, 5.0 parts by weight, 5.2 parts by weight, 5.5 parts by weight, 5.7 parts by weight, 6.0 parts by weight, 6.2 parts by weight, 6.5 parts by weight, 6.7 parts by weight, 7.0 parts by weight, 7.2 parts by weight, 7.5 parts by weight, 7.7 parts by weight, 8.0 parts by weight, 8.2 parts by weight, 8.5 parts by weight, 8.7 parts by weight, 9.0 parts by weight, 9.2 parts by weight, 9.5 parts by weight, 9.7 parts by weight, or 10.0 parts by weight, and is preferably 0.5-5 parts by weight, and more preferably 0.8-2 parts by weight.

Preferably, the pH of the hydrophilic blocking slurry is adjusted to be basic, preferably 8-10, for example, 8, 8.2, 8.5, 8.7, 9.0, 9.2, 9.5, 9.7, or 10.0.

The solid content of the hydrophilic blocking slurry is preferably 2-30 wt %, for example, 2 wt %, 3 wt %, wt %, 4 wt %, 5 wt %, 7 wt %, 10 wt %, 12 wt %, 15 wt %, 17 wt %, 20 wt %, 22 wt %, 25 wt %, 27 wt %, 30 wt %, and more preferably 5-25 wt %.

The amount of the hydrophilic blocking slurry coated on the surface of the porous substrate may be selected according to an expected thickness of the hydrophilic blocking layer. Generally, the amount of the hydrophilic blocking slurry coated is such that the hydrophilic blocking layer has a thickness of 0.1-3 µm, for example, 0.1 µm, 0.2 µm, 0.3 µm, 0.4 µm, 0.5 µm, 0.6 µm, 0.7 µm, 0.8 µm, 0.9 µm, 1 µm, 1.1 µm, 1.2 µm, 1.3 µm, 1.4 µm, 1.5 µm, 1.6 µm, 1.7 µm, 1.8 µm, 1.9 µm, 2 µm, 2.1 µm, 2.2 µm, 2.3 µm, 2.4 µm, 2.5 µm, 2.6 µm, 2.7 µm, 2.8 µm, 2.9 µm, or 3 µm. Preferably, the amount of the hydrophilic blocking slurry coated is such that the hydrophilic blocking layer has a thickness of 0.1-1 µm, and more preferably 0.3-0.8 µm.

In step (1), the polar polymer binder solution may be coated after the hydrophilic blocking coating is dried to form the hydrophilic blocking layer, or the polar polymer binder solution may be directly coated on the surface of the hydrophilic blocking coating without drying the hydrophilic blocking coating. Preferably, the polar polymer binder solution is coated after the hydrophilic blocking coating is dried to form the hydrophilic blocking layer, so as to further improve the permeability and ionic conductivity of the ultimately prepared polymer separator, and further improve the performance of the lithium-ion battery using the polymer separator.

In step (1), the temperature for drying may be 10-120° C. Preferably, the temperature for drying is not higher than 100° C. More preferably, the temperature for drying is not higher than 80° C., and is, for example, 10-80° C., specifically 10° C., 15° C., 20° C., 25° C., 30° C., 35° C., 40° C., 45° C., 50° C., 55° C., 60° C., 65° C., 70° C., 75° C., or 80° C. Preferably, the temperature for drying is 40-60° C., for example, 50-60° C. In step (1), the drying may be performed under normal pressure or under reduced pressure. Preferably, the drying is performed under normal pressure. The drying may be performed in a blast drying oven. In step (1), the duration of the drying may be selected according to the drying temperature and the type of dispersant used. Generally, the duration of the drying may be 0.1-24 h, for example, 0.1 h, 0.2 h, 0.5 h, 0.7 h, 1 h, 1.2 h, 1.5 h, 1.7 h, 2.0 h, 2.2 h, 2.5 h, 2.7 h, 3.0 h, 3.2 h, 3.5 h, 3.7 h, 4.0 h, 4.2 h, 4.5 h, 4.7 h, 5.0 h, 5.2 h, 5.5 h, 5.7 h, 6.0 h, 6.2 h, 6.5 h, 6.7 h, 7.0 h, 7.2 h, 7.5 h, 7.7 h, 8.0 h, 8.2 h, 8.5 h, 8.7 h, 9.0 h, 9.2 h, 9.5 h, 9.7 h, 10.0 h, 10.5 h, 11 h, 11.5 h, 12 h, 12.5 h, 13 h, 13.5 h, 14 h, 14.5 h, 15 h, 15.5 h, 16 h, 16.5 h, 17 h, 17.5 h, 18 h, 18.5 h, 19 h, 19.5 h, 20.0 h, 20.5 h, 21 h, 21.5 h, 22 h, 22.5 h, 23 h, 23.5 h, or 24 h, and is preferably 5-18 h, and more preferably 8-12 h.

According to the method of the present disclosure, a water contact angle of the hydrophilic blocking layer may be not greater than 40°, and is, for example, 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, or 40°. Preferably, the water contact angle of the hydrophilic blocking layer is 20° or below. When the water contact angle of the hydrophilic blocking layer is 20° or below, the performance of the polymer separator can be more significantly improved, for example, the permeability and ionic conductivity of the polymer separator can be more significantly improved, so that lithium-ion batteries using the polymer separator exhibit more excellent performance. More preferably, the water contact angle of the hydrophilic blocking layer formed in step (1) is 2-15°, and more preferably 5-10°.

In step (2), the polar polymer binder solution contains an organic solvent, and a polar polymer binder and a pore-forming agent which are dissolved in the organic solvent.

The polar polymer binder may be selected from at least one of polyvinylidene fluoride, a vinylidene fluoride-hexafluoropropylene copolymer, and a vinylidene fluoride-acrylate copolymer, for example, one or more of polyvinylidene fluoride, a vinylidene fluoride-hexafluoropropylene copolymer, and a vinylidene fluoride-acrylate copolymer.

The organic solvent may be a low-boiling solvent (an organic solvent having a boiling point lower than 60° C.) such as acetone; or a high-boiling solvent, for example, a solvent having a boiling point higher than 60° C.; or a mixture of a low-boiling solvent and a high-boiling solvent. For the mixture of a low-boiling solvent and a high-boiling solvent, to further improve the operational safety, the content of the low-boiling solvent is preferably controlled to be not higher than a safety threshold to avoid fire and explosion.

In an implementation, the organic solvent is a low-boiling solvent, preferably acetone. According to this implementation, under preferable conditions, the prepared polymer separator and lithium-ion battery exhibit more excellent performance, and especially the lithium-ion battery prepared using the polymer separator exhibits significantly increased high-rate discharge performance and high-temperature performance. The preferable conditions include that: the particle size of the hydrophilic inorganic particles is preferably 1 nm to 2 μm, more preferably 10 nm to 1 μm, further preferably 20 nm to 800 nm, and still further preferably 50 nm to 350 nm; the water contact angle of the hydrophilic blocking layer is preferably 20° or below; and the drying in step (2) is performed at a temperature not higher than 60° C.

In another implementation, the organic solvent is a high-boiling solvent, for example, an organic solvent having a boiling point of 60° C. or above (for example, 60-260° C.), preferably an organic solvent having a boiling point of 120° C. or above (for example, 120-260° C.), and more preferably an organic solvent having a boiling point of 140° C. or above (for example, 140-260° C.). Further preferably, the boiling point of the organic solvent is 145-260° C., for example, 150-230° C. Specific examples of the organic solvent may include, but not limited to, selected from at least one of triethyl phosphate, N-methylpyrrolidone, N,N-dimethylacetamide, N,N-dimethylformamide, and dimethylsulfoxide, and more preferably include, but not limited to, one or more of triethyl phosphate, N-methylpyrrolidone, N,N-dimethylacetamide, N,N-dimethylformamide, and dimethylsulfoxide. According to this implementation, the operational safety can be improved.

In still another implementation, the organic solvent is mixture of a low-boiling solvent and a high-boiling solvent. The low-boiling solvent and the high-boiling solvent are the same as those described above. In this implementation, based on the total amount of the organic solvent, the content of the high-boiling solvent may be 0.1-99.9 wt %, and the content of the low-boiling solvent may be 0.1-99.9 wt %.

The pore-forming agent is preferably an organic pore-forming agent. The boiling point of the pore-forming agent is preferably higher than that of the organic solvent, so that during, the organic solvent evaporates earlier than the pore-forming agent, thereby enhancing the pore-forming effect. Preferably, the boiling point of the pore-forming agent is 61-261° C., for example, 61° C., 65° C., 70° C., 75° C., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., 200° C., 205° C., 210° C., 215° C., 220° C., 225° C., 230° C., 235° C., 240° C., 245° C., 250° C., 255° C., 260° C., or 261° C. The pore-forming agent may be a carbonate compound and/or an alcohol ether compound, and specific examples may include, but not limited to, selected from at least one of ethylene carbonate, propylene carbonate, dimethyl carbonate, diethyl carbonate, ethyl methyl carbonate, vinylene carbonate, diethylene glycol dimethyl ether, dipropylene glycol methyl ether, dipropylene glycol ethyl ether, and dipropylene glycol dimethyl ether, and preferably include, but not limited to, one or more of ethylene carbonate, propylene carbonate, dimethyl carbonate, diethyl carbonate, ethyl methyl carbonate, vinylene carbonate, diethylene glycol dimethyl ether, dipropylene glycol methyl ether, dipropylene glycol ethyl ether, and dipropylene glycol dimethyl ether.

In the polar polymer binder solution, the weight ratio of the organic solvent to the pore-forming agent may be 1:0.01-1, for example, 1:0.01, 1:0.05, 1:0.1, 1:0.15, 1:0.2, 1:0.25, 1:0.3, 1:0.35, 1:0.4, 1:0.45, 1:0.5, 1:0.55, 1:0.6, 1:0.65, 1:0.7, 1:0.75, 1:0.8, 1:0.85, 1:0.9, 1:0.95, 1:0.1, 1:0.15, 1:0.2, 1:0.25, 1:0.3, 1:0.35, 1:0.4, 1:0.45, 1:0.5, 1:0.55, 1:0.6, 1:0.65, 1:0.7, 1:0.75, 1:0.8, 1:0.85, 1:0.9, 1:0.95, or 1:1. Preferably, in the polar polymer binder solution, the weight ratio of the organic solvent to the pore-forming agent is 1:0.02-0.5. More preferably, in the polar polymer binder solution, the weight ratio of the organic solvent to the pore-forming agent is 1:0.03-0.3. Further preferably, in the polar polymer binder solution, the weight ratio of the organic solvent to the pore-forming agent is 1:0.05-0.1.

In step (2), the concentration of the polar polymer binder in the polar polymer binder solution is 1-30 wt %, for example, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, or 30 wt %, and is preferably 2-25 wt %. To further improve the performance of the ultimately prepared polymer separator and the performance of the lithium-ion battery using the polymer separator, the concentration of the polar polymer binder in the polar polymer binder solution is more preferably 5-20 wt %. Further preferably, the concentration of the polar polymer binder in the polar polymer binder solution is a critical concentration (which is generally 8-15 wt %, and preferably 10-12 wt %). The critical concentration is a concentration at which the polar polymer binder solution penetrates the porous substrate. In an environment of 25° C., one standard atmosphere, and relative humidity of RH45%-55%, the polar polymer binder solution is coated on a surface of the porous substrate, and it is observed whether the polar polymer binder solution penetrates the porous substrate within 1 h. A concentration between the concentration at which the solution penetrates the porous substrate and the concentration at which the solution does not penetrate the porous substrate is used as the critical concentration. When the concentration of the polar polymer binder is the critical concentration, the polar polymer binder is microscopically gel-like in the solution, and it is difficult for single molecules to flow and diffuse, so that the interaction between polar polymer molecules can be enhanced, and an ideal physical cross-linking network structure is formed during the solvent evaporation process. In this way, the polymer separator has more excellent permeability and ionic conductivity, and the lithium ion battery using the polymer separator has more excellent performance.

The amount of the polar polymer binder solution coated may be selected according to an expected thickness of the polar polymer bonding layer. The amount of the polar polymer binder solution coated may be such that the thickness of the ultimately formed porous polar polymer bonding layer is 0.1-10 μm, for example, 0.1 μm, 0.2 μm, 0.3 μm, 0.4 μm, 0.5 μm, 0.6 μm, 0.7 μm, 0.8 μm, 0.9 μm, 1.0 μm, 1.2 μm, 1.5 μm, 1.6 μm, 1.7 μm, 2.0 μm, 2.2 μm, 2.5 μm, 2.7 μm, 3.0 μm, 3.2 μm, 3.5 μm, 3.7 μm, 4.0 μm, 4.2 μm, 4.5 μm, 4.7 μm, 5.0 μm, 5.2 μm, 5.4 μm, 5.7 μm, 6.0 μm, 6.2 μm, 6.5 μm, 6.7 μm, 7.0 μm, 7.2 μm, 7.5 μm, 7.7 μm, 8.0 μm, 8.2 μm, 8.5 μm, 8.7 μm, 9.0 μm, 9.2 μm, 9.4 μm, 9.7 μm, or 10 μm, and is preferably 0.2-5 μm, more preferably 0.7-3 μm, and further preferably 0.8-1.5 μm.

In step (3), the drying may be performed at a temperature not higher than 120° C. Preferably, the drying may be performed at a temperature not higher than 60° C., and the temperature may be 10-60° C., for example, 10° C., 15° C., 20° C., 25° C., 30° C., 35° C., 40° C., 45° C., 50° C., 55° C., or 60° C. The drying at the temperature not higher than 60° C. enables the polar polymer bonding layer to have a more excellent pore structure, so as to further improve the permeability and ionic conductivity of the ultimately prepared polymer separator, and further improve the performance of the lithium-ion battery using the polymer separator. More preferably, the drying is performed at a temperature of 20-55° C. Further preferably, the drying is performed at a temperature of 30-45° C. The duration of the drying may be selected according to the drying temperature. Specifically, the duration of the drying may be 0.1-36 h, preferably 5-30 h, more preferably 10-24 h, and further preferably 15-24 h.

In step (1) and step (2), one or a combination or more than one of conventional coating methods such as roller coating, spray coating, dip coating, and screen printing may be used.

According to the method of the present disclosure, in the polymer separator prepared, the hydrophilic blocking layer and the porous polar polymer bonding layer may be formed on a single surface of the porous substrate, or the hydrophilic blocking layer and the porous polar polymer bonding layer may be formed on two surfaces of the porous substrate.

According to the method of the present disclosure, in an implementation, the ultimately prepared polymer separator consists of a porous substrate, a hydrophilic blocking layer, and a porous polar polymer bonding layer, where the porous substrate is a porous polymer film, the hydrophilic blocking layer is attached to a surface of the porous substrate, and the porous polar polymer bonding layer is attached to a surface of the hydrophilic blocking layer. According to this implementation, the hydrophilic blocking layer and the porous polar polymer bonding layer may be disposed in sequence on one surface of the porous substrate (i.e., the polymer separator has the following structure: porous polymer film-|hydrophilic blocking layer|porous polar polymer bonding layer), or the hydrophilic blocking layer and the porous polar polymer bonding layer may be disposed on each of two opposite surfaces of the porous substrate (i.e., the polymer separator has the following structure: porous polymer bonding layer|hydrophilic blocking layer|porous polymer film|hydrophilic blocking layer|porous polar polymer bonding layer).

According to the method of the present disclosure, in another implementation, the ultimately prepared polymer separator consists of a porous substrate, a hydrophilic blocking layer, and a porous polar polymer bonding layer, where the porous substrate is a composite film of a porous polymer film and a ceramic film. According to this implementation, in an example, the ceramic film is attached to the surface of the porous polymer film, the hydrophilic blocking layer is attached to the surface of the ceramic film, the porous polar polymer bonding layer is attached to the surface of the hydrophilic blocking layer (i.e., the polymer separator has the following structure: porous polymer film|ceramic film-|hydrophilic blocking layer|porous polar polymer bonding layer). In another example, the porous polymer film is attached to the surface of the ceramic layer, the hydrophilic blocking layer is attached to the surface of the porous polymer film, the porous polar polymer bonding layer is attached to the surface of the hydrophilic blocking layer (i.e., the polymer separator has the following structure: ceramic film|porous polymer film|hydrophilic blocking layer|porous polar polymer bonding layer). In still another example, the ceramic film is attached to the surface of the porous polymer film, and the hydrophilic blocking layer and the porous polar polymer bonding layer are attached in sequence to the other surface of the ceramic film and the other surface of the porous polymer film (i.e., the polymer separator has the following structure: porous polar polymer bonding layer-|hydrophilic blocking layer ceramic film|porous polymer film|hydrophilic blocking layer|porous polar polymer bonding layer).

According to a third aspect of the present disclosure, the present disclosure provides a polymer separator prepared by the method according to the second aspect of the present disclosure.

The total thickness of the polymer separator prepared by the method according to the second aspect of the present disclosure may be conventional, and generally may be 5-50 μm, for example, 5 μm, 8 μm, 9 μm, 10 μm, 11 μm, 12 μm, 13 μm, 15 μm, 18 μm, 20 μm, 23 μm, 25 μm, 28 μm, 30 μm, 32 μm, 35 μm, 38 μm, 40 μm, 42 μm, 44 μm, 46 μm, 48 μm, or 50 μm, preferably 8-30 μm, and more preferably 10-20 μm.

The polymer separator prepared by the method according to the second aspect of the present disclosure has high permeability. Generally, the Gurley value of the polymer separator prepared by the method according to the second aspect of the present disclosure is 100-900 Sec/100 mL, for example, 100 Sec/100 mL, 120 Sec/100 mL, 150 Sec/100 mL, 170 Sec/100 mL, 190 Sec/100 mL, 200 Sec/100 mL, 220 Sec/100 mL, 250 Sec/100 mL, 270 Sec/100 mL, 290 Sec/100 mL, 300 Sec/100 mL, 325 Sec/100 mL, 350 Sec/100 mL, 370 Sec/100 mL, 390 Sec/100 mL, 400 Sec/100 mL, 425 Sec/100 mL, 450 Sec/100 mL, 480 Sec/100 mL, 500 Sec/100 mL, 520 Sec/100 mL, 550 Sec/100 mL, 575 Sec/100 mL, 600 Sec/100 mL, 625 Sec/100 mL, 650 Sec/100 mL, 675 Sec/100 mL, 690 Sec/100 mL, 700 Sec/100 mL, 720 Sec/100 mL, 740 Sec/100 mL, 770 Sec/100 mL, 790 Sec/100 mL, 800 Sec/100 mL, 825 Sec/100 mL, 850 Sec/100 mL, 875 Sec/100 mL, or 900 Sec/100 mL, preferably 120-600 Sec/100 mL, and more preferably 120-500 Sec/100 mL. Further preferably, the Gurley value of the polymer separator prepared by the method according to the second aspect of the present disclosure is 150-350 Sec/100 mL, for example, 200-300 Sec/100 mL.

As compared with a ceramic layer used in an existing polymer separator to improve the thermal stability and electrolytic solution adsorption capacity of the separator, the hydrophilic blocking layer in the polymer separator prepared by the method according to the second aspect of the present disclosure is more hydrophilic and can effectively block the polar polymer from entering the porous substrate during preparation. As compared with the existing polymer separator, in the polymer separator prepared by the method according to the second aspect of the present disclosure, pores in the porous polar polymer bonding layer have a larger pore size (the pore size of pores in the porous polar polymer bonding layer of the existing polymer separator is generally 0.5-1 μm, and the pore size of pores in the porous polar polymer bonding layer of the polymer separator of the present disclosure may be 3 μm or above, and generally 3-10 μm), the porous polar polymer bonding layer is a multi-layer interwoven screen structure, and part of the surface of the hydrophilic blocking layer is exposed through the multi-layer interwoven screen structure; however, the porous polar polymer bonding layer of the existing polymer separator is more compact and is honeycomb-like.

In the polymer separator prepared by the method according to the second aspect of the present disclosure, pore walls in the porous polar polymer bonding layer in the prepared polymer separator may be provided with node structures, that is, pore walls between pores in the porous polar polymer bonding layer may be provided with node structures. Nodes in the node structure may protrude from the pore wall (i.e., protrude relative to the pore wall surface), or may not protrude from the pore wall (i.e., not protrude relative to the pore wall surface).

According to a fourth aspect of the present disclosure, the present disclosure provides use of a polymer separator according to the first or third aspect of the present disclosure in a lithium-ion battery.

According to a fifth aspect of the present disclosure, the present disclosure provides a lithium-ion battery, including a cathode, an anode, and a polymer separator, where the polymer separator is a polymer separator according to the first or third aspect of the present disclosure.

The cathode is formed by coating a slurry formulated by a cathode material for lithium-ion batteries, a conductive agent, and a binder, onto an aluminum foil. The cathode material used includes any cathode material that can be used for lithium-ion batteries, for example, one or more of lithium cobalt oxide ($LiCoO_2$), lithium nickel oxide ($LiNiO_2$), lithium manganese oxide ($LiMn_2O_4$), and lithium iron phosphate ($LiFePO_4$). The anode is formed by coating a slurry formulated by an anode material for lithium-ion batteries, a conductive agent, and a binder, onto a copper foil. The anode material used includes any anode material that can be used for lithium-ion batteries, for example, one or more of graphite, soft carbon, and hard carbon.

The lithium-ion battery of the present disclosure may or may not include an electrolytic solution. The electrolytic solution is known to those skilled in the art, and contains a lithium salt and an organic solvent. The lithium salt may be a dissociable lithium salt, and for example, may be one or more selected from lithium hexafluorophosphate ($LiPF_6$), lithium perchlorate ($LiClO_4$), and lithium tetrafluoroborate ($LiBF_4$). The organic solvent may be one or more selected from ethylene carbonate (EC), propylene carbonate (PC), dimethyl carbonate (DMC), ethyl methyl carbonate (EMC), diethyl carbonate (DEC), and vinylene carbonate (VC). Preferably, the concentration of the lithium salt in the electrolyte solution is 0.8-1.5 mol/L.

According to a sixth aspect of the present disclosure, the present disclosure provides a method for preparing a lithium-ion battery, the method including:
S1. preparing a polymer separator by the method according to the second aspect of the present disclosure; and
S2. disposing the polymer separator between a cathode and an anode to form a battery cell, followed by packaging.

Step S2 may be performed using a conventional method in the field of lithium-ion battery preparation technologies, which is not particularly limited in the present disclosure. In step S2, an electrolytic solution may be filled into a battery cell, or packaging is directly performed without filling an electrolytic solution.

The present disclosure will be described in detail below by way of embodiments; however, the scope of the present disclosure is not limited thereto.

The following test methods are involved in the embodiments and comparative examples below.
(1) The areal density is determined by gravimetry.
(2) The water contact angle of the hydrophilic blocking layer is measured using a method specified in GB/T 30693-2014 "Measurement of water-contact angle of plastic films".
(3) The particle size is a volume mean particle size measured using a laser particle size analyzer.
(4) The specific surface area is measured using a method specified in GB/T 19587-2004 "Determination of the specific surface area of solids by gas adsorption using the BET method".

The present disclosure is further described below through embodiments, but the embodiments are not intended to limit the content of the present disclosure.

Embodiments 1-1 to 1-4 are used for preparing the hydrophilic blocking layer of the present disclosure.

Embodiment 1-1

Figure 1B:
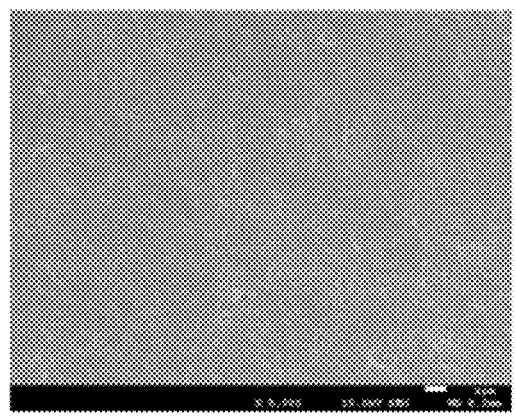

Hydrophilic silica prepared by a gas-phase method (having a specific surface area of 380 m2/g and a particle size of 80 nm, purchased from Aladdin), acrylate binder (P1005™, purchased from Shanghai Aigao Chemical Co., Ltd.), a dispersant (PVA, purchased from Aladdin), a dispersant (PAANa, purchased from Showa Denko, Japan), and carboxymethyl cellulose (CMC, purchased from Daicel, Japan) as a thickener were dispersed in water at 92:8:0.4:0.4:1.2 (weight ratio) to form a slurry having a solid content of 8 wt %, the pH of the slurry was adjusted to 8, and the slurry was stirred uniformly, to form a hydrophilic blocking slurry. The hydrophilic blocking slurry was coated on two sides of a single-sided ceramic separator (9 μm PE+2 μm ceramic layer, ceramic particles in the ceramic layer being micron-sized aluminum oxide ceramic particles, purchased from Shandong Sinocera, same below)) by gravure roller coating, and dried at 60° C. for 12 h to obtain a separator having a hydrophilic blocking layer, where the hydrophilic blocking layer has a thickness of 0.5 and the water contact angle of the hydrophilic blocking layer was 5°. FIG. 1A and FIG. 1B are SEM images showing the morphology of the hydrophilic blocking layer.

Embodiment 1-2

Hydrophilic silica prepared by a precipitation method (having a specific surface area of 370 m2/g and a particle size of 150 nm, purchased from Aladdin), acrylate binder (P1005™, purchased from Shanghai Aigao Chemical Co., Ltd.), a dispersant (PVA), a dispersant (PAANa), and a thickener Latekoll® D (purchased from BASF) were dispersed in water at 90:10:0.4:0.4:1.2 (weight ratio) to form a slurry having a solid content of 8 wt %, the pH of the slurry was adjusted to 10, and the slurry was stirred uniformly, to form a hydrophilic blocking slurry. The hydrophilic blocking slurry was coated on two sides of a single-sided ceramic separator by gravure roller coating, and dried at 60° C. for 10 h to obtain a separator having a hydrophilic blocking layer, where the hydrophilic blocking layer has a thickness of 0.7 µm, and the water contact angle of the hydrophilic blocking layer was 8°.

Embodiment 1-3

Hydrophilic aluminum oxide prepared by a gas-phase method (having a specific surface area of 350 m2/g and a particle size of 200 nm, purchased from Aladdin), acrylate binder (P2010™, purchased from Shanghai Aigao Chemical Co., Ltd.), a dispersant (PVA), a dispersant (PAANa), and a thickener Latekoll™ D (purchased from BASF) were dispersed in water at 85:15:0.2:0.3:1 (weight ratio) to form a slurry having a solid content of 20 wt %, the pH of the slurry was adjusted to 10, and the slurry was stirred uniformly, to form a hydrophilic blocking slurry. The hydrophilic blocking slurry was spray coated on two sides of a single-sided ceramic separator, and dried at 50° C. for 8 h to obtain a separator having a hydrophilic blocking layer, where the hydrophilic blocking layer has a thickness of 0.6 µm, and the water contact angle of the hydrophilic blocking layer was 10°.

Embodiment 1-4

Hydrophilic aluminum oxide prepared by a gas-phase method (having a specific surface area of 320 m2/g and a particle size of 320 nm, purchased from Aladdin), acrylate binder (P2010™, purchased from Shanghai Aigao Chemical Co., Ltd.), a dispersant (PVA), a dispersant (PAANa), and a thickener Latekoll® D (purchased from BASF) were dispersed in water at 95:5:0.4:0.4:1.2 (weight ratio) to form a slurry having a solid content of 17 wt %, the pH of the slurry was adjusted to 9, and the slurry was stirred uniformly, to form a hydrophilic blocking slurry. The hydrophilic blocking slurry was coated on two sides of a single-sided ceramic separator by gravure roller coating, and dried at 50° C. for 12 h to obtain a separator having a hydrophilic blocking layer, where the hydrophilic blocking layer has a thickness of 0.8 and the water contact angle of the hydrophilic blocking layer was 8°.

The following embodiments are used for preparing the polymer separator and lithium-ion battery of the present disclosure.

Embodiment 2-1A (1) P(VdF-HFP) powder (Kynar Flex® LBG powder purchased from Arkema, the same below) was dissolved in a mixture of N,N-dimethylformamide and propylene carbonate, the concentration of P(VdF-HFP) was controlled to be a critical concentration (which was 10 wt %), and the mixture was stirred uniformly to obtain a polar polymer binder solution, where the weight ratio of N,N-dimethylformamide to propylene carbonate was 1:0.05.

The polar polymer binder solution was coated by gravure roller coating onto the surface of the hydrophilic blocking layer on two sides of the separator having a hydrophilic blocking layer that is prepared in Embodiment 1-1, followed by blast drying at 35° C. for 20 h to form a porous polar polymer bonding layer, thus obtaining the polymer separator of the present disclosure.

(2) $LiCoO_2$, PVDF binder, and carbon black are formulated into a slurry according to a mass ratio of 100:0.8:0.5, coated on an aluminum foil, and dried to prepare a 0.114 mm thick $LiCoO_2$ cathode.

Styrene-butadiene rubber (SBR) and carboxymethyl cellulose (CMC) were dispersed in water, stirred at a high speed with artificial graphite and a conductive agent at a mass ratio of 2.5:1.5:90:6 at room temperature (25° C.) for 3.5 h, and the mixture was coated on a copper foil and dried to prepare a 0.135 mm thick graphite anode.

(3) In a dry room, the $LiCoO_2$ cathode, the graphite anode, and the polymer separator prepared in step (2) are wound to prepare CSL454187 type $LiCoO_2$/graphite soft pack lithium-ion battery cell, which was then filled with an electrolytic solution and packaged to obtain a lithium-ion battery, where the original ceramic surface faces toward the cathode, the electrolyte in the electrolytic solution is lithium hexafluorophosphate having a concentration of 1 mol/L, the organic solvent is a mixture obtained by mixing EC, EMC and DEC at a weight ratio of 1:1:1.

Embodiment 2-1B

In Embodiment 2-1B, a lithium-ion battery was prepared through the same method as described in Embodiment 2-1A, except that in step (1), the polar polymer binder solution is coated by dip coating onto the surface of the hydrophilic blocking layer on two sides of the separator having a hydrophilic blocking layer that is prepared in Embodiment 1-3, where the separator having a hydrophilic blocking layer was dipped into the polar polymer binder solution for 30 s.

Embodiment 2-2A

In Embodiment 2-2A, a lithium-ion battery was prepared through the same method as described in Embodiment 2-1A, except that the polymer separator was prepared by the following method: dissolving P(VdF-HFP) powder in a mixture of N-methylpyrrolidone and propylene carbonate, controlling the concentration of P(VdF-HFP) to be a critical concentration (which was 12 wt %), and stirring uniformly to obtain a polar polymer binder solution, where the weight ratio of N-methylpyrrolidone to propylene carbonate was 1:0.06. The polar polymer binder solution was coated by gravure roller coating onto the surface of the hydrophilic blocking layer on two sides of the separator having a hydrophilic blocking layer that is prepared in Embodiment 1-2, followed by blast drying at 30° C. for 24 h to form a porous polar polymer bonding layer, thus obtaining the polymer separator of the present disclosure.

Embodiment 2-2B

In Embodiment 2-2B, a lithium-ion battery was prepared through the same method as described in Embodiment 2-2A, except that in step (1), the polar polymer binder solution is coated by dip coating onto the surface of the hydrophilic blocking layer on two sides of the separator having a hydrophilic blocking layer that is prepared in Embodiment 1-4, where the separator having a hydrophilic blocking layer was dipped into the polar polymer binder solution for 30 s.

Embodiment 2-3A

In Embodiment 2-3A, a lithium-ion battery was prepared through the same method as described in Embodiment 2-1A, except that the polymer separator was prepared by the following method: dissolving P(VdF-HFP) powder in a mixture of triethyl phosphate and propylene carbonate, controlling the concentration of P(VdF-HFP) to be a critical concentration (which was 12 wt %), and stirring uniformly to obtain a polar polymer binder solution, where the weight ratio of triethyl phosphate to propylene carbonate was 1:0.1. The polar polymer binder solution was coated by gravure roller coating onto the surface of the hydrophilic blocking layer on two sides of the separator having a hydrophilic blocking layer that is prepared in Embodiment 1-2, followed by blast drying at 40° C. for 18 h to form a porous polar polymer bonding layer, thus obtaining the polymer separator of the present disclosure.

Embodiment 2-3B

In Embodiment 2-3B, a lithium-ion battery was prepared through the same method as described in Embodiment 2-3A, except that in step (1), the polar polymer binder solution is coated by dip coating onto the surface of the hydrophilic blocking layer on two sides of the separator having a hydrophilic blocking layer that is prepared in Embodiment 1-3, where the separator having a hydrophilic blocking layer was dipped into the polar polymer binder solution for 30 s.

Embodiment 2-4A

In Embodiment 2-4A, a lithium-ion battery was prepared through the same method as described in Embodiment 2-1A, except that the polymer separator was prepared by the following method: dissolving P(VdF-HFP) powder in a mixture of N,N-dimethylformamide and dipropylene glycol dimethyl ether which serves as a pore-forming agent, controlling the concentration of P(VdF-HFP) to be a critical concentration (which was 10 wt %), and stirring uniformly to obtain a polar polymer binder solution, where the weight ratio of N,N-dimethylformamide to dipropylene glycol dimethyl ether was 1:0.06.

The polar polymer binder solution was coated by gravure roller coating onto the surface of the hydrophilic blocking layer on two sides of the separator having a hydrophilic blocking layer that is prepared in Embodiment 1-1, followed by blast drying at 45° C. for 15 h to form a porous polar polymer bonding layer, thus obtaining the polymer separator of the present disclosure.

Embodiment 2-4B

In Embodiment 2-4B, a lithium-ion battery was prepared through the same method as described in Embodiment 2-4A, except that in step (1), the polar polymer binder solution is coated by dip coating onto the surface of the hydrophilic blocking layer on two sides of the separator having a hydrophilic blocking layer that is prepared in Embodiment 1-3, where the separator having a hydrophilic blocking layer was dipped into the polar polymer binder solution for 30 s.

Embodiment 2-5A

In Embodiment 2-5A, a lithium-ion battery was prepared through the same method as described in Embodiment 2-1A, except that the polymer separator was prepared by the following method: dissolving P(VdF-HFP) powder in a mixture of N-methylpyrrolidone and dipropylene glycol dimethyl ether which serves as a pore-forming agent, controlling the concentration of P(VdF-HFP) to be a critical concentration (which was 12 wt %), and stirring uniformly to obtain a polar polymer binder solution, where the weight ratio of N-methylpyrrolidone to dipropylene glycol dimethyl ether was 1:0.08.

The polar polymer binder solution was spray coated onto the surface of the hydrophilic blocking layer on two sides of the separator having a hydrophilic blocking layer that is prepared in Embodiment 1-1, followed by blast drying at 45° C. for 15 h to form a porous polar polymer bonding layer, thus obtaining the polymer separator of the present disclosure.

Embodiment 2-5B

In Embodiment 2-5B, a lithium-ion battery was prepared through the same method as described in Embodiment 2-5A, except that in step (1), the polar polymer binder solution is coated by dip coating onto the surface of the hydrophilic blocking layer on two sides of the separator having hydrophilic blocking layers that is prepared in Embodiment 1-3, where the separator having hydrophilic blocking layers was dipped into the polar polymer binder solution for 30 s.

Comparative Example 1

A polymer separator and a lithium-ion battery were prepared through the same method as described in Embodiment 2-1A, except that in step (1), the separator having a hydrophilic blocking layer was replaced with a single-sided ceramic separator in Embodiment 1-1 (9 μmPE+2 μm ceramic layer), i.e., the polar polymer binder solution was directly coated onto the surfaces on two sides of the single-sided ceramic separator, and N,N-dimethylformamide was replaced with an equal weight of acetone, to obtain the polymer separator.

Comparative Example 2

A polymer separator and a lithium-ion battery were prepared through the same method as described in Embodiment 2-4B, except that during the preparation of the polymer separator, the separator having a hydrophilic blocking layer was replaced with a single-sided ceramic separator in Embodiment 1-3 (9 μmPE+2 μm ceramic layer), i.e., the polar polymer binder solution was directly coated onto the surfaces on two sides of the single-sided ceramic separator, and N,N-dimethylformamide was replaced with an equal weight of acetone, to obtain the polymer separator (the polymer separator does not have a hydrophilic blocking layer).

Comparative Example 3

A polymer separator and a lithium-ion battery were prepared through the same method as described in Embodiment 2-4B, except that the polar polymer binder solution does not contain a pore-forming agent.

Embodiment 3

A polymer separator and a lithium-ion battery were prepared through the same method as described in Embodiment 2-4B, except that in step (1), the blast drying is not performed at 45° C. for 15 h, but is performed at 120° C. for 8 h.

Embodiment 4

A polymer separator and a lithium-ion battery were prepared through the same method as described in Embodiment 2-4B, except that during the preparation of the polar polymer binder solution, the concentration of P(VdF-HFP) was controlled to be 3.5 wt % (which is not the critical concentration).

Embodiment 5

A polymer separator and a lithium-ion battery were prepared through the same method as described in Embodiment 2-4B, except that during the preparation of the polar polymer binder solution, the concentration of P(VdF-HFP) was controlled to be 22 wt % (which is not the critical concentration).

Embodiment 6

A polymer separator and a lithium-ion battery were prepared through the same method as described in Embodiment 2-4B, except that during the preparation of the polar polymer binder solution, N,N-dimethylformamide was replaced with an equal weight of acetone.

Embodiment 7

A separator having a hydrophilic blocking layer was prepared through the same method as described in Embodiment 1-1, except that in step (1), hydrophilic silica prepared by a gas-phase method was replaced with quartz (having a specific surface area of 10 m$^2$/g and a particle size of 10 μm) to obtain a separator having a hydrophilic blocking layer, where the water contact angle of the formed hydrophilic blocking layer was 40°; a polymer separator and a lithium-ion battery were prepared through the same method as described in Embodiment 2-1A, except that the separator having a hydrophilic blocking layer that is prepared in Embodiment 7 was used.

Embodiment 8

A separator having a hydrophilic blocking layer was prepared through the same method as described in Embodiment 1-3, except that hydrophilic aluminum oxide prepared by a gas-phase method was replaced with aluminum oxide prepared by aluminum alkoxide hydrolysis (having a specific surface area of 130 m$^2$/g and a particle size of 5 μm) to obtain a separator having a hydrophilic blocking layer, where the water contact angle of the formed hydrophilic blocking layer was 36°; a polymer separator and a lithium-ion battery were prepared through the same method as described in Embodiment 2-4B, except that the separator having a hydrophilic blocking layer that is prepared in Embodiment 8 was used.

Embodiment 9

A polymer separator and a lithium-ion battery were prepared through the same method as described in Embodiment 2-5A, except that no drying was performed after the hydrophilic blocking slurry is coated onto the two sides of the single-sided ceramic separator through the same method as described in Embodiment 1-1, but instead, after the polar polymer binder solution was spray coated directly through the method described in Embodiment 2-5A, drying was performed through the same method as described in Embodiment 2-5A, thus obtaining the polymer separator.

Test Example (1) Observation of the Surface Morphology of Polymer Separator:

The microscopic morphologies of the polymer separators prepared in the embodiments and comparative examples were observed under a scanning electron microscope (SEM, JEOL, JSM-7600FE).

Figure 2A:
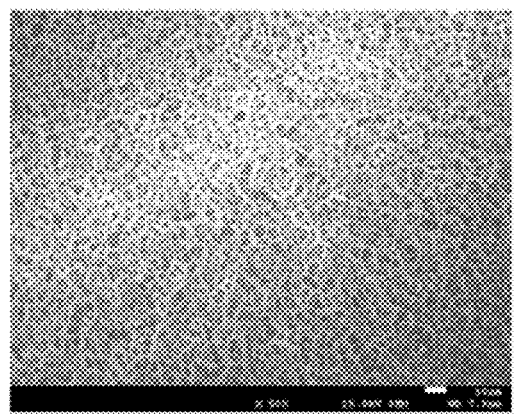
FIG. 2A and FIG. 2B are SEM images showing the surface morphology of a polymer separator prepared in Embodiment 2-5A, where
Figure 2B:
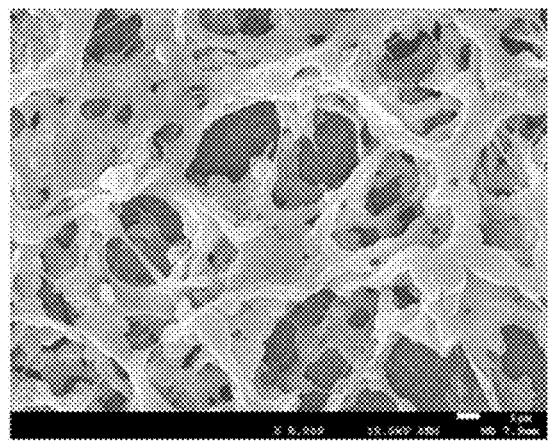
Figure 3A:
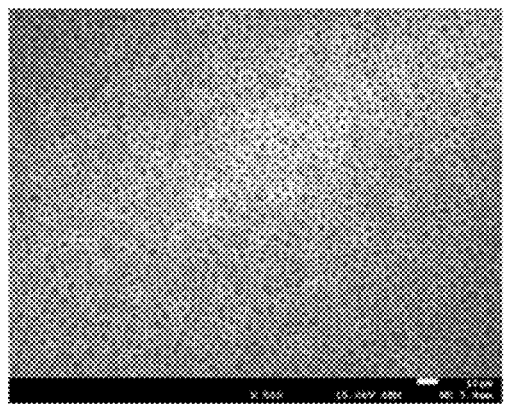
FIG. 3A and FIG. 3B are SEM images showing the surface morphology of a polymer separator prepared in Embodiment 2-4A, where
Figure 3B:
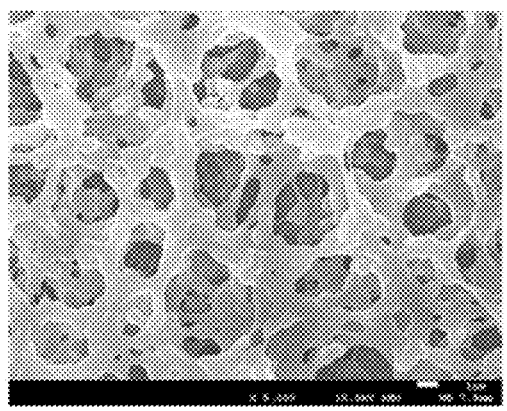
Figure 4A:
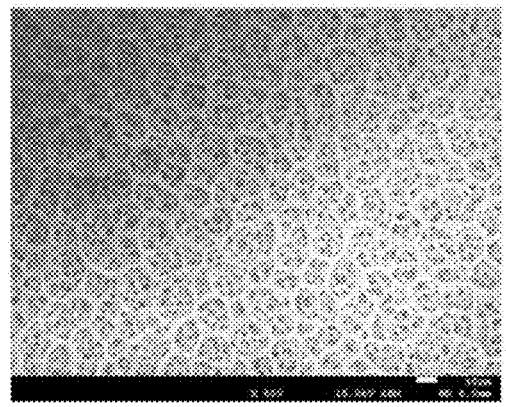
FIG. 4A and FIG. 4B are SEM images showing the surface morphology of a polymer separator prepared in Embodiment 2-4B, where
Figure 4B:
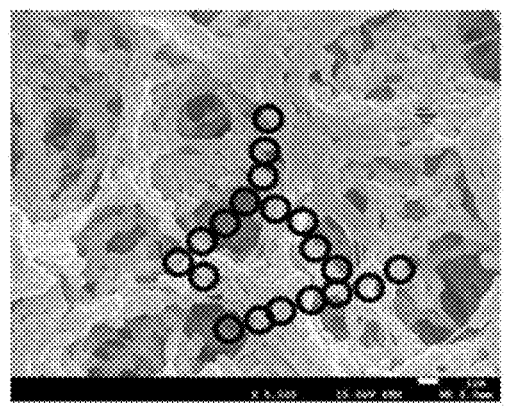
Figure 5A:
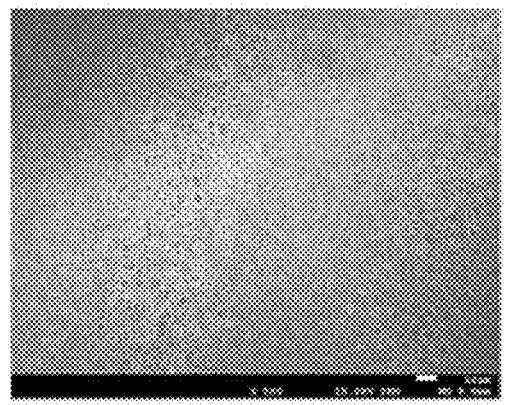
FIG. 5A and FIG. 5B are SEM images showing the surface morphology of a polymer separator prepared in Comparative Example 2, where
Figure 5B:
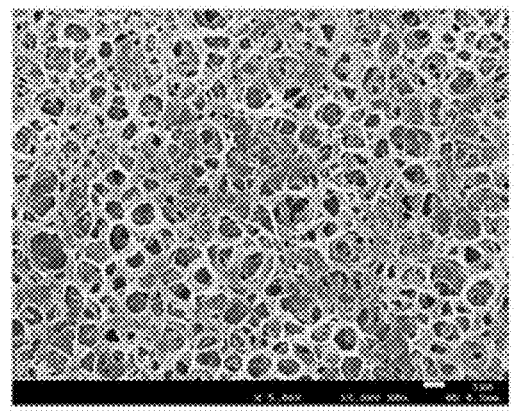

FIG. 2A and FIG. 2B are SEM images showing the morphology of the polymer separator prepared in Embodiment 2-5A, FIG. 3A and FIG. 3B are SEM images showing the morphology of the polymer separator prepared in Embodiment 2-4A, and FIG. 4A and FIG. 4B are SEM images showing the morphology of the polymer separator prepared in Embodiment 2-4B. It can be seen from FIG. 2A, FIG. 2B, FIG. 3A, FIG. 3B, FIG. 4A, and FIG. 4B that a porous polar polymer bonding layer with good porosity can be prepared by the method of the present disclosure, and pore walls in the prepared porous polar polymer bonding layer have nodes. FIG. 5A and FIG. 5B are SEM images showing the morphology of the polymer separator prepared in Comparative Example 2, and FIG. 6A and FIG. 6B are SEM images showing the morphology of the polymer separator prepared in Comparative Example 3. By comparing FIG. 4A and FIG. 4B with FIG. 5A and FIG. 5B, it can be seen that the pore size of pores in the porous polar polymer bonding layer of the polymer separator of the present disclosure was larger, the porous polar polymer bonding layer was a multi-layer interwoven screen structure, and part of the surface of the hydrophilic blocking layer was exposed through the multi-layer interwoven screen structure; while the porous polar polymer bonding layer in the polymer separator prepared in Comparative Example 2 was more compact and was honeycomb-like. By comparing FIG. 4A and FIG. 4B with FIG. 6A and FIG. 6B, it can be seen that pore walls in the porous polar polymer bonding layer of the polymer separator prepared by the method of the present disclosure had node structures, which may result from phase separation during precipitation of the polar polymer due to the addition of the pore-forming agent to the polar polymer binder solution.

(2) Permeability (Gurley Value) and Apparent Porosity Test of the Polymer Separator A Model 4110N Gurley permeability meter was used for testing. The time for 100 mL of air to pass through a 1.0-square inch polymer separator under one standard atmosphere was measured. The test result of the permeability of the polymer separator was listed in Table 1. It can be seen from the result in Table 1 that the polymer separator of the present disclosure exhibits good permeability.

The apparent porosity of the polymer separator can be calculated according to the following formula:

$$P\% = \left(1 - \frac{\rho M}{\rho P}\right) \times 100\% = \left(1 - \frac{\rho f}{\rho P \times d}\right) \times 100\%$$

In the above formula, ρM is the apparent density,
ρf is the areal density,
ρP is the bulk density, and
d is the thickness of the polymer separator.
It can be seen from the data in Table 1 that the polymer separator of the present disclosure has high apparent porosity.

(3) Thermal Shrinkage Test of the Polymer Separator

The polymer separator (having an area of 5 mm×5 mm) was subjected to isothermal heat treatment in a constant temperature oven respectively at 90° C. and 120° C. for 2 h and 1 h, to represent the temperature resistance of the polymer separator. The experimental results were listed in Table 1, and it can be seen from the results in Table 1 that the polymer separator of the present disclosure has low thermal shrinkage.

(4) Tensile Strength Test of the Polymer Separator

The measurement was performed using a universal mechanical tester according to the method specified in GB/T 13022-1991. The experimental results were listed in Table 1, and it can be seen from the results in Table 1 that the polymer separator of the present disclosure has high tensile strength.

(5) Puncture Strength Test of the Polymer Separator

The measurement was performed using a universal mechanical tester according to the method specified in GB/T 1004-2008, where a steel needle having a diameter of 1 mm was used. The experimental results were listed in Table 1, and it can be seen from Table 1 that the polymer separator of the present disclosure has high puncture strength.

(6) Ionic Conductivity Test of the Polymer Separator

An AC impedance method was used for testing, and specific operation steps are as follows.

The polymer separator was cut into discs having a diameter of 17 mm. The discs were dried, stacked to form three layers, and disposed between two stainless steel (SS) electrodes to absorb sufficient electrolytic solution (where the electrolyte was lithium hexafluorophosphate having a concentration of 1 mol/L, and the organic solvent was a mixture obtained by mixing EC, EMC and DEC at a weight ratio of 1:1:1), and sealed in a 2016-type button cell. An AC impedance test was performed using an electrochemical workstation (CHI 660C, CH Instrument Inc., Shanghai), where the AC signal frequency range was 0.01 Hz to 1 MHz, the sine wave potential amplitude was 5 mV, the intersection of linear and real axes is the bulk resistance of the polymer separator. The ionic conductivity of the polymer separator is calculated using the following formula:

$$\sigma = L/(A \cdot R),$$

where L represents the thickness of the gel polymer electrolyte,

TABLE 1

| No. | Thickness[1] (μm) | Gurley value (Sec/100 mL) | Coating areal density[2] (g/m²) | Puncture strength (kgf) | Tensile strength (kgf/cm²) Longitudinal | Tensile strength (kgf/cm²) Transverse | Thermal shrinkage (%) 90° C., 2 h Longitudinal | Thermal shrinkage (%) 90° C., 2 h Transverse | Thermal shrinkage (%) 120° C., 1 h Longitudinal | Thermal shrinkage (%) 120° C., 1 h Transverse |
|---|---|---|---|---|---|---|---|---|---|---|
| Embodiment 2-1A | 13 | 249 | 1.0 + 1.0 | 0.490 | 1618 | 1658 | 0.4 | 0.1 | 0.6 | 0.3 |
| Embodiment 2-1B | 13 | 231 | 1.0 + 1.0 | 0.457 | 1587 | 1735 | 0.4 | 0 | 0.8 | 0.4 |
| Embodiment 2-2A | 13 | 239 | 1.0 + 1.0 | 0.350 | 1535 | 1823 | 0.5 | 0.1 | 0.8 | 0.2 |
| Embodiment 2-2B | 13 | 246 | 1.0 + 1.0 | 0.343 | 1862 | 1754 | 0.2 | 0.1 | 0.5 | 0.3 |
| Embodiment 2-3A | 13 | 273 | 1.0 + 1.0 | 0.451 | 1844 | 1965 | 0.1 | 0.1 | 0.5 | 0.2 |
| Embodiment 2-3B | 13 | 255 | 1.0 + 1.0 | 0.416 | 1726 | 1881 | 0.2 | 0.1 | 0.5 | 0.2 |
| Embodiment 2-4A | 13 | 211 | 1.0 + 1.0 | 0.424 | 1564 | 1603 | 0.2 | 0 | 0.6 | 0.2 |
| Embodiment 2-4B | 13 | 285 | 1.0 + 1.0 | 0.417 | 1397 | 1572 | 0.1 | 0 | 0.7 | 0.3 |
| Embodiment 2-5A | 13 | 280 | 1.0 + 1.0 | 0.420 | 1490 | 1779 | 0.3 | 0.1 | 0.9 | 0.3 |
| Embodiment 2-5B | 13 | 204 | 1.0 + 1.0 | 0.436 | 2110 | 1744 | 0.2 | 0 | 0.7 | 0.2 |
| Comparative Example 1 | 13 | 214 | 0.8 + 0.8 | 0.383 | 1388 | 1440 | 1.5 | 0.4 | 1.1 | 0.4 |
| Comparative Example 2 | 13 | >1200 | 0.8 + 0.8 | 0.466 | 1104 | 907 | 3.5 | 0.8 | 4.4 | 1.7 |
| Comparative Example 3 | 13 | 247 | 1.0 + 1.0 | 0.476 | 1586 | 1625 | 0.4 | 0.1 | 0.9 | 0.3 |
| Embodiment 3 | 13 | 828 | 0.8 + 0.8 | 0.443 | 1747 | 1433 | 0.1 | 0.3 | 0.4 | 0.4 |
| Embodiment 4 | 13 | 540 | 0.8 + 0.8 | 0.457 | 1409 | 1125 | 0.4 | 0.2 | 0.4 | 0.4 |
| Embodiment 5 | 13 | 719 | 0.8 + 0.8 | 0.409 | 1434 | 1108 | 0.3 | 0.2 | 0.3 | 0.3 |
| Embodiment 6 | 13 | 227 | 0.8 + 0.8 | 0.430 | 1379 | 1227 | 0.3 | 0.2 | 0.4 | 0.1 |
| Embodiment 7 | 13 | 815 | 0.8 + 0.8 | 0.499 | 1304 | 1037 | 0.4 | 0.2 | 0.4 | 0.9 |
| Embodiment 8 | 13 | 601 | 0.8 + 0.8 | 0.451 | 1661 | 1412 | 0.3 | 0.1 | 0.7 | 0.4 |
| Embodiment 9 | 13 | 409 | 0.8 + 0.8 | 0.414 | 1439 | 1156 | 0.4 | 0.2 | 0.1 | 0.3 |

[1]Thickness of the polymer separator;
[2]single-side areal densities of the polar polymer coating on two surfaces of the polymer separator A is the contact area between the stainless steel plate and the polymer separator, and R is the bulk impedance of the polymer electrolyte.

The bulk impedance and ionic conductivity of the polymer separator are listed in Table 2.

It can be seen from Table 2 that the polymer separator of the present disclosure exhibits excellent ionic conductivity.

TABLE 2

| No. | Stainless steel electrode diameter (cm) | Contact area (cm$^2$) | Separator thickness (cm) | Bulk impedance (Ω) | Ionic conductivity (mS/cm) |
|---|---|---|---|---|---|
| Embodiment 2-1A | 1.58 | 1.96 | 0.00407 | 5.8 | 0.36 |
| Embodiment 2-1B | 1.58 | 1.96 | 0.00407 | 5.4 | 0.38 |
| Embodiment 2-2A | 1.58 | 1.96 | 0.00407 | 5.6 | 0.37 |
| Embodiment 2-2B | 1.58 | 1.96 | 0.00407 | 5.3 | 0.39 |
| Embodiment 2-3A | 1.58 | 1.96 | 0.00407 | 5.5 | 0.38 |
| Embodiment 2-3B | 1.58 | 1.96 | 0.00407 | 5.7 | 0.36 |
| Embodiment 2-4A | 1.58 | 1.96 | 0.00407 | 5.9 | 0.35 |
| Embodiment 2-4B | 1.58 | 1.96 | 0.00407 | 5.7 | 0.36 |
| Embodiment 2-5A | 1.58 | 1.96 | 0.00411 | 5.7 | 0.37 |
| Embodiment 2-5B | 1.58 | 1.96 | 0.00411 | 5.5 | 0.38 |
| Comparative Example 1 | 1.58 | 1.96 | 0.00411 | 6.6 | 0.32 |
| Comparative Example 2 | 1.58 | 1.96 | 0.00411 | 6.5 | 0.32 |
| Comparative Example 3 | 1.58 | 1.96 | 0.00407 | 5.8 | 0.36 |
| Embodiment 3 | 1.58 | 1.96 | 0.00411 | 21 | 0.10 |
| Embodiment 4 | 1.58 | 1.96 | 0.00411 | 16 | 0.13 |
| Embodiment 5 | 1.58 | 1.96 | 0.00378 | 7.7 | 0.25 |
| Embodiment 6 | 1.58 | 1.96 | 0.00378 | 9 | 0.21 |
| Embodiment 7 | 1.58 | 1.96 | 0.00378 | 6 | 0.32 |
| Embodiment 8 | 1.58 | 1.96 | 0.00378 | 20.3 | 0.10 |
| Embodiment 9 | 1.58 | 1.96 | 0.00378 | 17 | 0.11 |

Figure 7A:
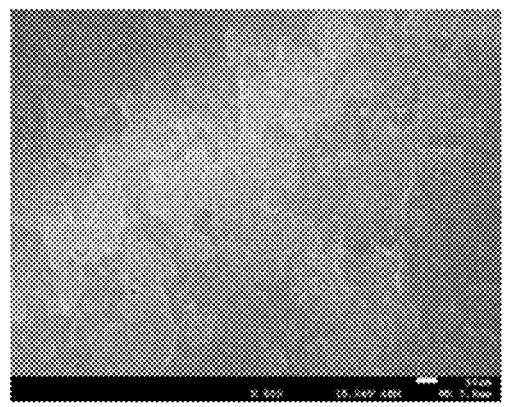
FIG. 7A and FIG. 7B are SEM images showing the morphology of a polymer separator side (FIG. 7A) and a cathode side (FIG. 7B) after a bonding contact surface between the polymer separator prepared in Embodiment 2-4B and a cathode is peeled off.
Figure 7B:
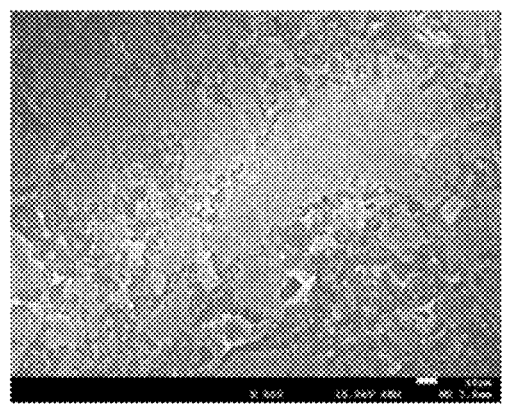

(7) Test of the Adhesion and Peeling Strength of the Polymer Separator to the Cathode and Anode The prepared lithium-ion battery (subjected to 85° C., 4 h, 1 MPa hot pressing) was dissected in a fully charged state. The mechanical peeling strength was measured using a universal mechanical tester with reference to GBT 2792-2014 "Measurement of peel adhesion properties for adhesive tapes". The obtained cathode, anode, and separator were photographed. FIG. 7A and FIG. 7B as well as FIG. 8A and FIG. 8B are respectively SEM images showing the morphology of the lithium-ion battery prepared in Embodiment 2-4B after the cathode and anode are peeled off from the polymer separator, FIG. 9A and FIG. 10A are respectively graphs of peeling strength test of the cathode and anode of the lithium-ion battery prepared in Embodiment 2-4B, and FIG. 9B and FIG. 10B are respectively graphs of peeling strength test of the cathode and anode of the lithium-ion battery prepared in Comparative Example 2.

Figure 8A:
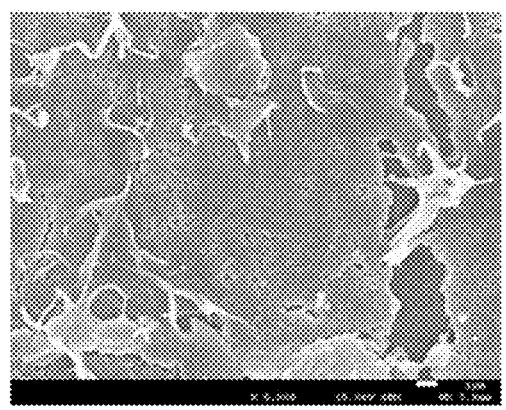
FIG. 8A and FIG. 8B are SEM images showing the morphology of a polymer separator side (FIG. 8A) and an anode side (FIG. 8B) after a bonding contact surface between the polymer separator prepared in Embodiment 2-4B and an anode is peeled off.
Figure 8B:
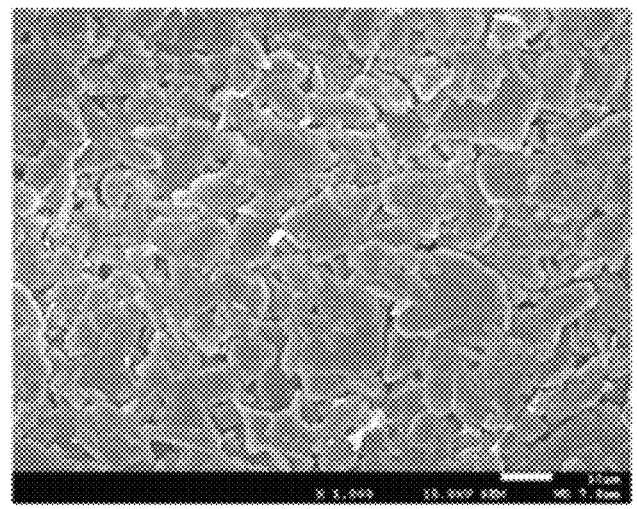

It can be seen from FIG. 7A and FIG. 7B as well as FIG. 8A and FIG. 8B that after the lithium-ion battery using the polymer separator of the present disclosure is peeled, the porous polar polymer bonding layer of the polymer separator was adhered to the cathode material, and some anode material was adhered to the polymer separator.

Figure 9A:
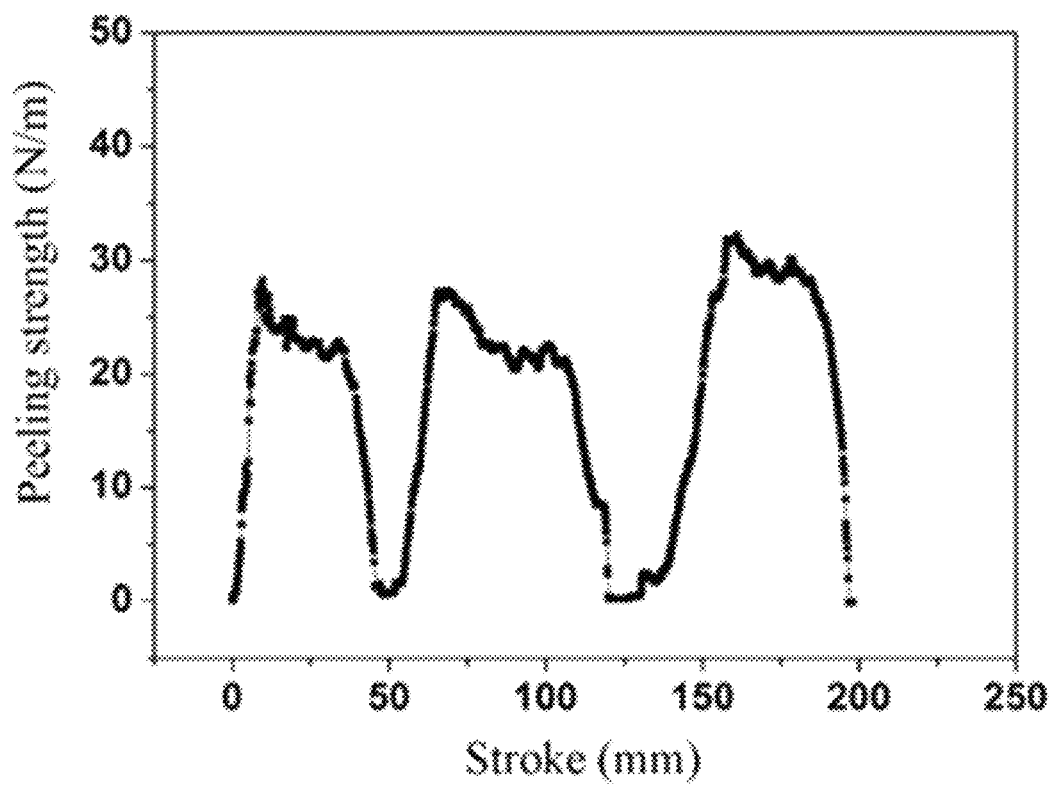
FIG. 9A and FIG. 9B are graphs of peeling strength test of cathodes and polymer separators of lithium-ion batteries prepared in Embodiment 2-4B (FIG. 9A) and Comparative Example 2 (FIG. 9B)
Figure 9B:
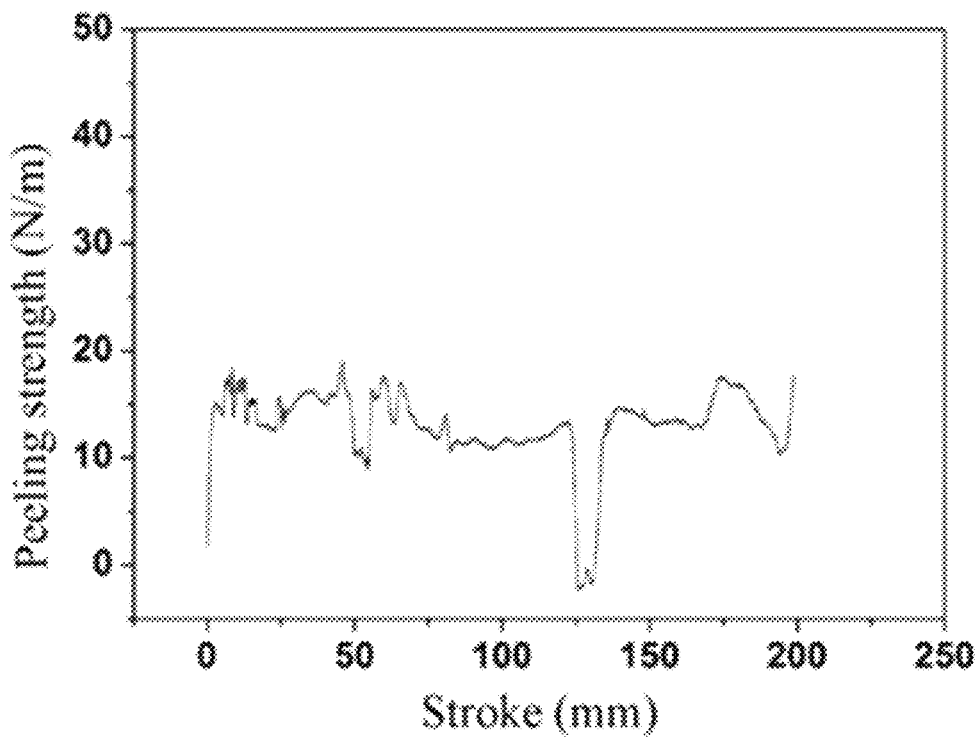
Figure 10A:
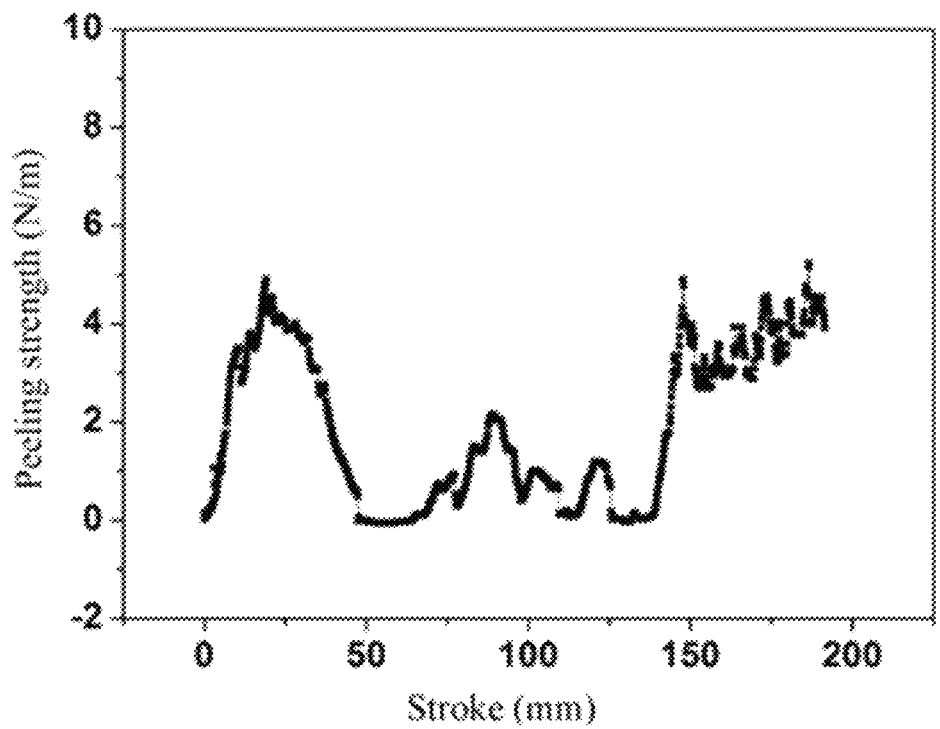
FIG. 10A and FIG. 10B are graphs of peeling strength test of anodes and polymer separators of lithium-ion batteries prepared in Embodiment 2-4B (FIG. 10A) and Comparative Example 2 (FIG. 10B).
Figure 10B:
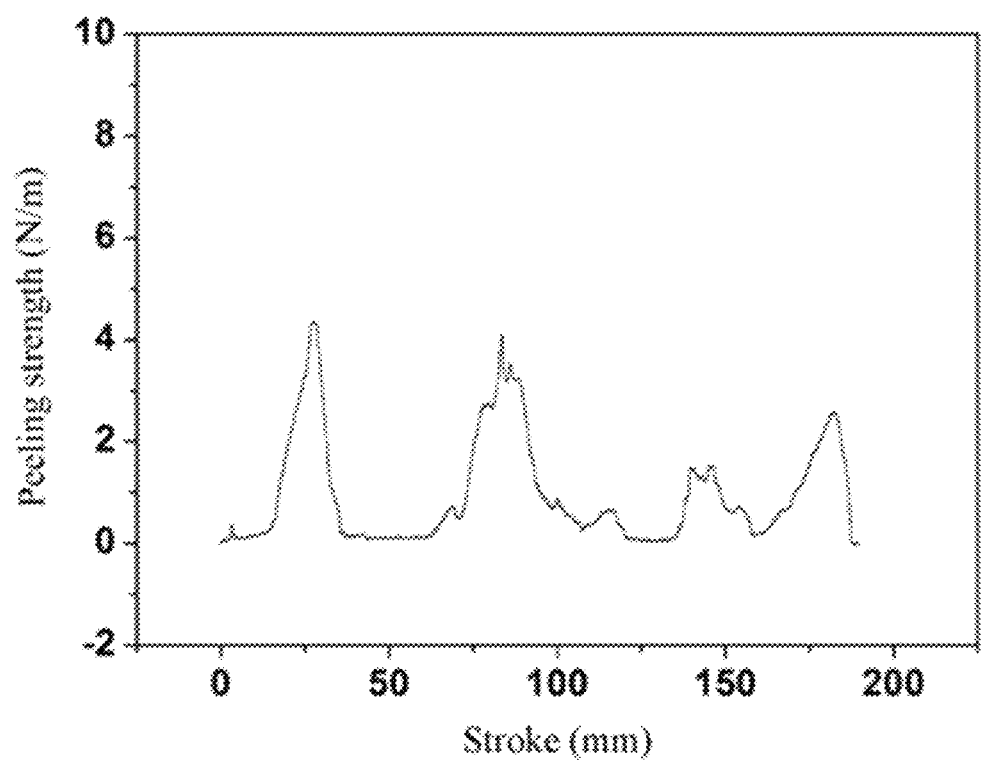

It can be seen from FIG. 9A and FIG. 9B that the adhesion of the polymer separator of the present disclosure to the cathode of the lithium-ion battery was quite great. It can be seen from FIG. 10A and FIG. 10B that the polymer separator of the present disclosure had higher bonding strength to the anode.

(8) Hardness Test of Lithium Ion Battery

The test results are listed in Table 3. As shown in Table 3, the lithium-ion battery of the present disclosure has high hardness.

TABLE 3

| No. | Conditions | Down pressure (kgf) | Displacement (mm) | 25° C. hardness (kgf/mm) | Conditions | Down pressure (kgf) | Displacement (mm) | 60° C. hardness (kgf/mm) |
|---|---|---|---|---|---|---|---|---|
| Embodiment 2-1A | 25° C. 1 H | 3.1 | 1.00 | 2.74 | 60° C. 1 H | 3.1 | 1.08 | 2.91 |
| Embodiment 2-1B | 25° C. 1 H | 3.1 | 1.01 | 2.73 | 60° C. 1 H | 3.1 | 1.17 | 2.96 |
| Embodiment 2-2A | 25° C. 1 H | 3.1 | 1.15 | 2.74 | 60° C. 1 H | 3.1 | 1.08 | 2.99 |
| Embodiment 2-2B | 25° C. 1 H | 3.1 | 1.03 | 2.77 | 60° C. 1 H | 3.1 | 1.02 | 2.91 |
| Embodiment 2-3A | 25° C. 1 H | 3.1 | 0.99 | 2.57 | 60° C. 1 H | 3.1 | 1.15 | 2.93 |
| Embodiment 2-3B | 25° C. 1 H | 3.1 | 1.01 | 2.77 | 60° C. 1 H | 3.1 | 1.00 | 2.91 |
| Embodiment 2-4A | 25° C. 1 H | 3.1 | 1.11 | 2.65 | 60° C. 1 H | 3.1 | 1.07 | 2.95 |
| Embodiment 2-4B | 25° C. 1 H | 3.1 | 1.16 | 2.73 | 60° C. 1 H | 3.1 | 1.00 | 2.97 |
| Embodiment 2-5A | 25° C. 1 H | 3.1 | 1.19 | 2.73 | 60° C. 1 H | 3.1 | 1.10 | 2.93 |

TABLE 3-continued

| No. | Conditions | Down pressure (kgf) | Displacement (mm) | 25° C. hardness (kgf/mm) | Conditions | Down pressure (kgf) | Displacement (mm) | 60° C. hardness (kgf/mm) |
|---|---|---|---|---|---|---|---|---|
| Embodiment 2-5B | 25° C. 1 H | 3.1 | 0.98 | 2.73 | 60° C. 1 H | 3.1 | 1.15 | 2.98 |
| Comparative Example 1 | 25° C. 1 H | 3.1 | 1.17 | 2.78 | 60° C. 1 H | 3.1 | 1.11 | 2.85 |
| Comparative Example 2 | 25° C. 1 H | 3.1 | 1.01 | 1.95 | 60° C. 1 H | 3.1 | 1.03 | 2.03 |
| Comparative Example 3 | 25° C. 1 H | 3.1 | 1.00 | 2.76 | 60° C. 1 H | 3.1 | 0.94 | 2.96 |
| Embodiment 3 | 25° C. 1 H | 3.1 | 1.11 | 2.79 | 60° C. 1 H | 3.1 | 1.08 | 2.90 |
| Embodiment 4 | 25° C. 1 H | 3.1 | 0.95 | 2.05 | 60° C. 1 H | 3.1 | 1.08 | 2.81 |
| Embodiment 5 | 25° C. 1 H | 3.1 | 0.96 | 2.03 | 60° C. 1 H | 3.1 | 1.06 | 2.80 |
| Embodiment 6 | 25° C. 1 H | 3.1 | 0.94 | 2.79 | 60° C. 1 H | 3.1 | 1.08 | 2.83 |
| Embodiment 7 | 25° C. 1 H | 3.1 | 1.11 | 2.31 | 60° C. 1 H | 3.1 | 1.00 | 2.84 |
| Embodiment 8 | 25° C. 1 H | 3.1 | 1.11 | 2.33 | 60° C. 1 H | 3.1 | 1.11 | 2.81 |
| Embodiment 9 | 25° C. 1 H | 3.1 | 0.99 | 2.50 | 60° C. 1 H | 3.1 | 1.03 | 2.82 |

(9) Normal-Temperature Cycle Performance Test of the Battery

A lithium-ion battery performance test cabinet (Guangzhou Lanqi, BK6016) was used to test the 25° C. cycle performance of the lithium-ion batteries after capacity grading prepared in the embodiments and comparative examples. The method is specifically: as follows:

the battery was charged to 4.40 V at 0.7 C and 0.2 C respectively, cut off, allowed to stand for 10 min, and discharged at 0.7 C or 0.2 C to 3.0 V; the cycle was repeatedly performed. The test results in Table 4 show that the lithium-ion battery of the present disclosure exhibits more excellent cycle performance.

TABLE 4

| | Capacity retention rate at 0.7 C (%) | | Capacity retention rate at 0.2 C (%) | |
|---|---|---|---|---|
| No. | After 100 cycles | After 200 cycles | After 100 cycles | After 200 cycles |
| Embodiment 2-1A | 99.3% | 96.8% | 100.0% | 98.0% |
| Embodiment 2-1B | 99.1% | 96.8% | 99.9% | 98.0% |
| Embodiment 2-2A | 99.3% | 96.7% | 100.0% | 98.0% |
| Embodiment 2-2B | 99.1% | 96.8% | 99.8% | 97.9% |
| Embodiment 2-3A | 99.3% | 96.8% | 100.0% | 98.0% |
| Embodiment 2-3B | 99.3% | 96.6% | 100.0% | 98.0% |
| Embodiment 2-4A | 99.3% | 96.7% | 100.0% | 97.9% |
| Embodiment 2-4B | 99.3% | 96.8% | 99.9% | 98.0% |
| Embodiment 2-5A | 99.1% | 96.8% | 99.8% | 98.0% |
| Embodiment 2-5B | 99.3% | 96.8% | 100.0% | 98.0% |
| Comparative Example 1 | 99.2% | 96.4% | 100.1% | 97.4% |
| Comparative Example 2 | 96.1% | 91.7% | 99.2% | 94.0% |
| Comparative Example 3 | 98.9% | 96.4% | 100.1% | 98.1% |
| Embodiment 3 | 96.4% | 92.4% | 100.1% | 95.4% |
| Embodiment 4 | 98.9% | 94.6% | 99.6% | 96.5% |
| Embodiment 5 | 98.5% | 94.5% | 99.5% | 96.4% |
| Embodiment 6 | 99.2% | 96.6% | 99.9% | 97.8% |
| Embodiment 7 | 98.2% | 94.2% | 99.1% | 96.1% |
| Embodiment 8 | 98.3% | 94.3% | 100.1% | 96.0% |
| Embodiment 9 | 98.0% | 95.5% | 99.9% | 96.9% |

(10) High-Temperature Cycle Performance Test of the Battery

A lithium-ion battery performance test cabinet (Guangzhou Lanqi, BK6016) was used to test the 45° C. cycle performance of the lithium-ion batteries after capacity grading obtained in the embodiments and comparative examples. The test method was as follows: the battery was charged to 4.40 V at 0.7 C, cut off, allowed to stand for 10 min, and discharged at 0.7 C to 3.0 V; the cycle was repeatedly performed. The cycle results are shown in Table 5.

The test results show that the lithium-ion battery of the present disclosure exhibits more excellent cycle performance. As can be seen, the polymer separator of the present disclosure helps improve the high-temperature performance of the battery.

TABLE 5

| | Capacity retention rate at 0.7 C (%) | |
|---|---|---|
| No. | After 100 cycles | After 200 cycles |
| Embodiment 2-1A | 97.4% | 97.1% |
| Embodiment 2-1B | 97.6% | 96.9% |
| Embodiment 2-2A | 97.4% | 97.0% |
| Embodiment 2-2B | 97.6% | 97.1% |
| Embodiment 2-3A | 97.4% | 97.1% |
| Embodiment 2-3B | 97.4% | 97.1% |
| Embodiment 2-4A | 97.5% | 96.9% |
| Embodiment 2-4B | 97.4% | 97.1% |
| Embodiment 2-5A | 97.7% | 97.1% |
| Embodiment 2-5B | 97.4% | 97.0% |
| Comparative Example 1 | 97.0% | 95.9% |
| Comparative Example 2 | 94.5% | 89.3% |
| Comparative Example 3 | 96.9% | 95.0% |
| Embodiment 3 | 96.9% | 95.1% |
| Embodiment 4 | 97.2% | 95.9% |
| Embodiment 5 | 96.8% | 93.0% |
| Embodiment 6 | 96.8% | 93.1% |
| Embodiment 7 | 97.1% | 95.2% |
| Embodiment 8 | 96.9% | 95.0% |
| Embodiment 9 | 96.9% | 95.1% |

(11) Rate Performance Test of Battery

A lithium-ion battery performance test cabinet (Guangzhou Lanqi, BK6016) was used to test the rate discharge performance of the lithium-ion batteries after capacity grading obtained in the embodiments and comparative examples. The test method is specifically as follows:

the battery was charged at a constant current of 0.5 C (1 C=2640 mA) and a constant voltage to 4.40 V, the cutoff current being 0.02 C; allowed to stand for 5 min; and discharged at 0.2 C/0.5 C/1 C/2 C/3 C/4 C to 3.0 V to record the discharge capacity.

The results of the rate discharge test are shown in Table 6. The test results show that the lithium-ion battery of the present disclosure exhibits excellent rate discharge performance.

TABLE 6

| No. | 3.0 V discharge capacity (mAh) | | | | | | 3.0 V capacity retention rate (%) | | | | | |
|---|---|---|---|---|---|---|---|---|---|---|---|---|
| | 0.2 C | 0.5 C | 1 C | 2 C | 3 C | 4 C | 0.2 C | 0.5 C | 1 C | 2 C | 3 C | 4 C |
| Embodiment 2-1A | 2622 | 2610 | 2591 | 2505 | 2405 | 2181 | 99.3 | 98.9 | 98.2 | 94.9 | 91.1 | 82.6 |
| Embodiment 2-1B | 2636 | 2620 | 2600 | 2516 | 2371 | 2015 | 99.9 | 99.3 | 98.5 | 95.3 | 89.8 | 76.3 |
| Embodiment 2-2A | 2630 | 2611 | 2589 | 2497 | 2362 | 2058 | 99.6 | 98.9 | 98.1 | 94.6 | 89.5 | 78.0 |
| Embodiment 2-2B | 2638 | 2620 | 2597 | 2507 | 2283 | 1742 | 99.9 | 99.3 | 98.4 | 95.0 | 86.5 | 66.0 |
| Embodiment 2-3A | 2636 | 2627 | 2602 | 2522 | 2428 | 2119 | 99.9 | 99.5 | 98.6 | 95.5 | 92.0 | 80.3 |
| Embodiment 2-3B | 2636 | 2621 | 2602 | 2533 | 2437 | 2288 | 99.9 | 99.3 | 98.6 | 95.9 | 92.3 | 86.7 |
| Embodiment 2-4A | 2658 | 2630 | 2603 | 2471 | 2224 | 2002 | 100.7 | 99.6 | 98.6 | 93.6 | 84.3 | 75.8 |
| Embodiment 2-4B | 2650 | 2620 | 2598 | 2512 | 2385 | 2060 | 100.3 | 99.2 | 98.4 | 95.1 | 90.3 | 78.0 |
| Embodiment 2-5A | 2652 | 2634 | 2609 | 2507 | 2265 | 1990 | 100.5 | 99.8 | 98.8 | 95.0 | 85.8 | 75.4 |
| Embodiment 2-5B | 2648 | 2626 | 2599 | 2471 | 2149 | 1942 | 100.3 | 99.5 | 98.5 | 93.6 | 81.4 | 73.6 |
| Comparative Example 1 | 2656 | 2625 | 2593 | 2428 | 2092 | 1818 | 100.6 | 99.4 | 98.2 | 92.0 | 79.2 | 68.8 |
| Comparative Example 2 | 2645 | 2568 | 2427 | 2306 | 1982 | 1598 | 100.2 | 97.3 | 91.9 | 87.3 | 75.1 | 60.5 |
| Comparative Example 3 | 2632 | 2609 | 2584 | 2493 | 2387 | 2118 | 99.7 | 98.8 | 97.9 | 94.4 | 90.4 | 80.2 |
| Embodiment 3 | 2660 | 2626 | 2604 | 2461 | 2012 | 1624 | 100.8 | 99.5 | 98.6 | 93.2 | 76.2 | 61.5 |
| Embodiment 4 | 2671 | 2625 | 2594 | 2500 | 2177 | 1879 | 101.2 | 99.4 | 98.3 | 94.7 | 82.5 | 71.2 |
| Embodiment 5 | 2660 | 2621 | 2576 | 2486 | 2104 | 1873 | 100.8 | 99.3 | 97.6 | 94.2 | 79.7 | 70.9 |
| Embodiment 6 | 2668 | 2638 | 2613 | 2486 | 2291 | 1932 | 101.1 | 99.9 | 99.0 | 94.2 | 86.8 | 73.2 |
| Embodiment 7 | 2634 | 2620 | 2593 | 2421 | 2113 | 1825 | 99.8 | 99.3 | 98.2 | 91.7 | 80.0 | 69.1 |
| Embodiment 8 | 2660 | 2633 | 2611 | 2468 | 2019 | 1631 | 100.8 | 99.7 | 98.9 | 93.5 | 76.5 | 61.8 |
| Embodiment 9 | 2665 | 2629 | 2592 | 2465 | 2192 | 1884 | 101.0 | 99.6 | 98.2 | 93.4 | 83.0 | 71.4 |

(12) High-Temperature Storage Performance Test of the Battery

The 85° C. 4 h storage performance of the lithium-ion batteries obtained in the embodiments and comparative examples were tested. The test method is as follows:

1) the battery was charged at 0.5 C to 4.40 V using a lithium-ion battery performance test cabinet (Guangzhou Lanqi, BK6016), cut off at 0.02 C, allowed to stand for 5 min, and discharged at 0.2 C to 3.0 V to record an initial discharge capacity;
2) the battery was charged at 0.5 C to 4.40 V, cut off at 0.02 C, and allowed to stand for 1 h to test an initial voltage, internal resistance, and thickness;
3) the battery was placed in a 85° C. oven and stored for 4 h;
4) the thickness was immediately tested after storage, and after standing at normal temperature for 2 h, a cooled thickness, voltage, and internal resistance after storage were tested;
5) the battery was discharged at 0.2 C to 3.0 V;
6) the battery was fully charged at 0.5 C, allowed to stand for 5 min, and discharged at 0.2 C to 3.0 V to record the recovered capacity, and the capacity recovery rate was calculated (by dividing the recovered capacity by the initial capacity).

The test results are shown in Table 7. It can be seen from Table 7 that the lithium-ion battery of the present disclosure has better capacity retention rate and better capacity recovery rate after high-temperature storage. As can be seen, the polymer separator of the present disclosure helps improve the high-temperature performance of the battery.

TABLE 7

| No. | Recovered capacity (mAh) | Capacity recovery rate (%) |
|---|---|---|
| Embodiment 2-1A | 2574 | 97.5% |
| Embodiment 2-1B | 2561 | 97.0% |
| Embodiment 2-2A | 2563 | 97.1% |
| Embodiment 2-2B | 2564 | 97.1% |
| Embodiment 2-3A | 2569 | 97.3% |
| Embodiment 2-3B | 2568 | 97.3% |

TABLE 7-continued

| No. | Recovered capacity (mAh) | Capacity recovery rate (%) |
|---|---|---|
| Embodiment 2-4A | 2555 | 96.8% |
| Embodiment 2-4B | 2568 | 97.3% |
| Embodiment 2-5A | 2570 | 97.4% |
| Embodiment 2-5B | 2561 | 97.0% |
| Comparative Example 1 | 2541 | 96.3% |
| Comparative Example 2 | 2490 | 94.3% |
| Comparative Example 3 | 2564 | 97.1% |
| Embodiment 3 | 2550 | 96.6% |
| Embodiment 4 | 2543 | 96.3% |
| Embodiment 5 | 2534 | 96.0% |
| Embodiment 6 | 2535 | 96.0% |
| Embodiment 7 | 2534 | 96.0% |
| Embodiment 8 | 2543 | 96.3% |
| Embodiment 9 | 2550 | 96.6% |

By comparing Embodiment 2-1A with Comparative Example 1 and comparing Embodiment 2-4B with Comparative Example 2, it can be seen that by providing a hydrophilic blocking layer, even if a high boiling-point solvent is used to formulate a polar polymer solution, the prepared lithium-ion battery has good rate discharge performance, and exhibits significantly improved discharge performance especially under high-rate discharge conditions.

By comparing Embodiment 2-4B with Embodiment 3, it can be seen that drying the polar polymer binder coating at a temperature not higher than 60° C. can significantly improve the permeability and ion conductivity of the prepared polymer separator, and significantly improve the performance of the ultimately prepared lithium-ion battery in various aspects. By comparing Embodiment 2-4B with Embodiments 4 and 5, it can be seen that controlling the concentration of the polar polymer in the polar polymer binder solution to be the critical concentration can significantly improve the permeability and ion conductivity of the prepared polymer separator, and significantly improve the performance of the ultimately prepared lithium-ion battery in various aspects. By comparing Embodiment 2-1A and Embodiment 2-4B with Embodiments 7 and 8 respectively, it can be seen that making the water contact angle of the hydrophilic blocking layer be not higher than 20° can further improve the performance of the ultimately prepared lithium-ion battery in various aspects. By comparing Embodiment 2-5A with Embodiment 9, it can be seen that coating the polar polymer binder solution after the hydrophilic blocking coating is dried to form the polar polymer bonding layer can further improve the permeability and ion conductivity of the prepared polymer separator, thereby improving the performance of the ultimately prepared lithium-ion battery in various aspects.

The preferred embodiments of the present disclosure are described in detail above, but the present disclosure is not limited to the specific details in the above embodiments. Various simple variations may be made to the technical solutions of the present disclosure within the scope of the technical idea of the present disclosure, and such simple variations shall all fall within the protection scope of the present disclosure.

It should be further noted that the specific technical features described in the above specific embodiments may be combined in any suitable manner without contradiction. To avoid unnecessary repetition, various possible combinations are not further described in the present disclosure.

In addition, the various embodiments of the present disclosure may be combined without departing from the idea of the present disclosure, and such combinations shall also fall within the scope of the present disclosure.

In the descriptions of this specification, descriptions using reference terms "an embodiment", "some embodiments", "an example", "a specific example", or "some examples" mean that specific characteristics, structures, materials, or features described with reference to the embodiment or example are included in at least one embodiment or example of the present disclosure. In this specification, schematic descriptions of the foregoing terms do not necessarily directed at a same embodiment or example. In addition, the described specific features, structures, materials, or features can be combined in a proper manner in any one or more embodiments or examples. In addition, in a case that is not mutually contradictory, a person skilled in the art can combine or group different embodiments or examples that are described in this specification and features of the different embodiments or examples.

Although the embodiments of the present disclosure are shown and described above, it may be understood that the foregoing embodiments are examples, and cannot be understood as limitations to the present disclosure. A person of ordinary skill in the art may make changes, modifications, replacements, and variations to the foregoing embodiments without departing from the scope of the present disclosure.

What is claimed is:

1. A polymer separator, comprising:
   a porous substrate,
   a hydrophilic blocking layer comprising hydrophilic inorganic particles and a binder, for binding the hydrophilic inorganic particles with each other together providing the hydrophilic blocking layer a water contact angle of 40° or less, and
   a porous polar polymer bonding layer,
   wherein the hydrophilic blocking layer is disposed between the porous substrate and the porous polar polymer bonding layer, pore walls in the porous polar polymer bonding layer are provided with node structures, and the node structures are mesh structures having mesh walls that are at least partially composed of spherical particles, which are spheres formed by secondary precipitation.

2. The polymer separator according to claim 1, wherein the polymer separator has a thickness of 8-30 μm; and a Gurley value of the polymer separator is 100-900 sec/100 mL.

3. The polymer separator according to claim 1, wherein: the hydrophilic inorganic particles are selected from at least one of hydrophilic $Al_2O_3$, hydrophilic $SiO_2$, hydrophilic $SnO_2$, hydrophilic $ZrO_2$, hydrophilic $TiO_2$, hydrophilic SiC, hydrophilic $Si_3N_4$, hydrophilic CaO, hydrophilic MgO, hydrophilic ZnO, hydrophilic $BaTiO_3$, hydrophilic $LiAlO_2$ and hydrophilic $BaSO_4$.

4. The polymer separator according to claim 1, wherein the hydrophilic inorganic particles are selected from at least one of hydrophilic $Al_2O_3$ and hydrophilic $SiO_2$, or from at least one of gas-phase hydrophilic $SiO_2$, precipitated hydrophilic $SiO_2$, and gas-phase hydrophilic $Al_2O_3$.

5. The polymer separator according to claim 1, wherein the hydrophilic inorganic particles have a particle size of 1 nm to 10 μm.

6. The polymer separator according to claim 1, wherein the hydrophilic inorganic particles have a specific surface area of 10-600 $m^2$/g.

7. The polymer separator according to claim 1, wherein content of the hydrophilic inorganic particles based on a total amount of the hydrophilic blocking layer is 50-95 wt %; wherein the hydrophilic blocking layer has a thickness of 0.1-3 μm.

8. The polymer separator according to claim 1, wherein the porous polar polymer bonding layer comprises a polar polymer, and the polar polymer is selected from at least one of polyvinylidene fluoride, a vinylidene fluoride-hexafluoropropylene copolymer, and a vinylidene fluoride-acrylate copolymer; and
wherein the porous polar polymer bonding layer has a thickness of 0.1-10 μm.

9. The polymer separator according to claim 8, wherein the porous polar polymer bonding layer has a thickness of 0.8-1.5 μm.

10. The polymer separator according to claim 1, wherein:
the porous substrate comprises a porous polymer layer;
the porous polymer layer is selected from at least one of a porous polyethylene layer, a porous polypropylene layer, and a porous polyethylene-polypropylene composite layer; and
the porous polymer layer has a thickness of 1-50 μm.

11. The polymer separator according to claim 1, wherein the porous polar polymer bonding layer is a multi-layer interwoven screen structure, and part of the surface of the hydrophilic blocking layer is exposed through the multi-layer interwoven screen structure.

12. The polymer separator according to claim 1, wherein the binder is selected from at least one of an acrylate polymer, a styrene-acrylate copolymer, polyvinylidene fluoride, a vinylidene fluoride-hexafluoropropylene copolymer, an acrylonitrile-acrylate copolymer, a vinyl chloride-acrylate copolymer, and a butadiene-styrene copolymer.

13. The polymer separator according to claim 1, wherein:
the porous substrate comprises a porous polymer layer and a ceramic layer,
the ceramic layer is disposed on one surface of the porous polymer layer,
the hydrophilic blocking layer is disposed on one surface of the ceramic layer away from the porous polymer layer, or the hydrophilic blocking layer is disposed on one surface of the porous polymer layer not providing with ceramic layer, or the hydrophilic blocking layer is disposed both on a surface of the ceramic layer away from the porous polymer layer and on a surface of the porous polymer layer not providing with ceramic layer.

14. The polymer separator according to claim 1, wherein:
the porous substrate comprises a porous polymer layer sandwiched between ceramic layers, and
the hydrophilic blocking layer is disposed on a surface of at least one of the ceramic layers that is away from the porous polymer layer.

15. A lithium-ion battery, comprising a cathode, an anode, and a polymer separator according to claim 1.

* * * * *